US007979709B2

(12) United States Patent
Takashima et al.

(10) Patent No.: US 7,979,709 B2
(45) Date of Patent: Jul. 12, 2011

(54) INFORMATION PROCESSING APPARATUS, INFORMATION RECORDING MEDIUM, APPARATUS AND METHOD OF MANUFACTURING INFORMATION RECORDING MEDIUM, AND COMPUTER PROGRAM

(75) Inventors: Yoshikazu Takashima, Tokyo (JP); Kenjiro Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 958 days.

(21) Appl. No.: 11/531,593

(22) Filed: Sep. 13, 2006

(65) Prior Publication Data
US 2007/0061584 A1 Mar. 15, 2007

(30) Foreign Application Priority Data
Sep. 14, 2005 (JP) .................. 2005-267532

(51) Int. Cl.
*H04L 9/00* (2006.01)
(52) U.S. Cl. .......... 713/176; 380/44; 380/200; 380/201; 713/178; 713/187; 726/32
(58) Field of Classification Search ................ 380/201; 713/176
See application file for complete search history.

(56) References Cited

U.S. PATENT DOCUMENTS

| 5,745,678 | A * | 4/1998 | Herzberg et al. ............... 726/32 |
| 5,757,915 | A * | 5/1998 | Aucsmith et al. ............. 713/187 |
| 5,966,446 | A * | 10/1999 | Davis ........................... 713/178 |
| 6,434,322 | B1 * | 8/2002 | Kimura et al. ................ 386/260 |
| 6,477,252 | B1 * | 11/2002 | Faber et al. ................... 380/200 |
| 6,915,326 | B2 * | 7/2005 | Hattori et al. ................. 709/202 |
| 7,177,860 | B2 * | 2/2007 | Ejima et al. ..................... 707/3 |
| 7,601,907 | B2 * | 10/2009 | Kobayashi .................... 84/613 |
| 2002/0112163 | A1 * | 8/2002 | Ireton ........................... 713/176 |
| 2002/0196729 | A1 * | 12/2002 | Fairman et al. ............. 369/275.4 |
| 2004/0009815 | A1 * | 1/2004 | Zotto et al. ..................... 463/42 |
| 2006/0153378 | A1 * | 7/2006 | Lotspiech et al. ............ 380/201 |
| 2007/0061584 | A1 * | 3/2007 | Takashima et al. .......... 713/176 |
| 2007/0083531 | A1 * | 4/2007 | Hussain ........................ 707/100 |
| 2007/0094505 | A1 * | 4/2007 | Futa et al. ..................... 713/176 |
| 2007/0159648 | A1 * | 7/2007 | Takashima .................. 358/1.14 |
| 2007/0180249 | A1 * | 8/2007 | Hatakeyama ................ 713/176 |
| 2007/0247985 | A1 * | 10/2007 | Ueda et al. ................... 369/47.1 |

(Continued)

FOREIGN PATENT DOCUMENTS
JP 03-233629 10/1991
(Continued)

OTHER PUBLICATIONS
Japanese Office Action for corresponding JP2005-267532 issued on Sep. 7, 2010.

*Primary Examiner* — Kambiz Zand
*Assistant Examiner* — Yonas Bayou
(74) *Attorney, Agent, or Firm* — K&L Gates LLP

(57) ABSTRACT

An information processing apparatus is provided. The information processing apparatus includes content verification means for executing a verification processing of a recording content recorded on an information recording medium, and content play means for executing a content play processing on a condition that validity of the recording content is checked on the basis of the verification processing. The content verification means acquires from the information recording medium a content hash table having registered therein hash values generated on the basis of legal recording content data and executes a processing for verifying a presence or absence of an illegal recording content whose hash value is not registered in the content hash table.

27 Claims, 28 Drawing Sheets

U.S. PATENT DOCUMENTS

| | | | |
|---|---|---|---|
| 2008/0076547 A1* | 3/2008 | Bigelow et al. | 463/29 |
| 2009/0041237 A1* | 2/2009 | Takashima et al. | 380/44 |
| 2009/0238362 A1* | 9/2009 | Kitani et al. | 380/44 |
| 2009/0245058 A1* | 10/2009 | Goto et al. | 369/53.44 |
| 2009/0254548 A1* | 10/2009 | Nagano et al. | 707/5 |

FOREIGN PATENT DOCUMENTS

| | | |
|---|---|---|
| JP | 2001-203686 | 7/2001 |
| JP | 2002-229829 | 8/2002 |
| JP | 2002-268948 | 9/2002 |
| JP | 2002251828 | 9/2002 |
| JP | 2002358011 | 12/2002 |
| JP | 2003-030017 | 1/2003 |
| JP | 2003-050732 | 2/2003 |
| JP | 2003-085046 | 3/2003 |
| JP | 2004-234641 | 8/2004 |
| JP | 2005-051734 | 2/2005 |
| WO | 2005-074187 | 8/2005 |

* cited by examiner

FIG. 3

| DISTINGUISHABLE INDEX IN APPLICATION LAYER, SUCH AS TITLE | CONTENT MANAGEMENT UNIT (CPS) | UNIT KEY (CPS) |
|---|---|---|
| TITLE 1 | CPS1 | Ku1 |
| TITLE 2 | CPS1 | Ku1 |
| APPLICATION 1 | CPS2 | Ku2 |
| APPLICATION 2 | CPS3 | Ku3 |
| ⋮ | ⋮ | ⋮ |
| DATA GROUP 1 | CPS4 | Ku4 |
| DATA GROUP 2 | CPS5 | Ku5 |
| ⋮ | ⋮ | ⋮ |

FIG. 10

```
HASH TABLE() {                                              #bytes
    NC: THE TOTAL NUMBER OF CLIP FILES                        2
    NH: THE TOTAL NUMBER OF HASH UNITS                        4
    for (i=0; i<NC; i++) {
        HASH UNIT NUMBER OF HEADER OF CLIP (i)                4
        NUMBER APPENDED TO FILE NAME OF CLIP (i)              4
        OFFSET VALUE OF CLIP (i)                              2
        ┌─ ─ ─ ─ ─ ─ ─ ─ ─ ─ ─ ─ ─ ─ ─ ─ ─ ─ ─ ─ ─ ─ ─ ┐
        │ for (i=0; i<NH; i++) {                              8 │
        │     Hash Value (i)                                    │
        │ }                                                     │
        └─ ─ ─ ─ ─ ─ ─ ─ ─ ─ ─ ─ ─ ─ ─ ─ ─ ─ ─ ─ ─ ─ ─ ┘
    }
}
```

WRITTEN BY DISC FACTORY

FIG. 19

| LSN | Structure | Descriptors | LBN |
|---|---|---|---|
| 0~15 | — | Reserved | — |
| 16~18 | Volume Recognition Sequence | | |
| 19~31 | — | Reserved | |
| 32 | Main Volume Descriptor Sequence | Primary Volume Descriptor | |
| 33 | | Implementation Use Volume Descriptor | |
| 34 | | Partition Descriptor | |
| 35 | | Logical Volume Descriptor | |
| 36 | | Unallocated Space Descriptor | |
| 37 | | Terminating Descriptor | |
| 38~47 | | Trailing Logical Sectors | |
| 48 | Logical Volume Integrity Sequence | Logical Volume Integrity Descriptor | |
| 49 | | Terminating Descriptor | |
| 50~63 | | Trailing Logical Sectors | |
| 64~255 | — | Reserved | |
| 256 | Anchor-1 | Anchor Volume Descriptor Pointer | |
| 257~271 | — | Reserved | |
| 272~LSNall-272 | Partition | File Structure and Files | 0~LBNall |
| LSNall-271~LSNall-257 | — | Reserved | — |
| LSNall-256 | Anchor-2 | Anchor Volume Descriptor Pointer | |
| LSNall-255~LSNall-224 | — | Reserved | |
| LSNall-223~LSNall-208 | Reserved Volume Descriptor Sequence | (IDENTICAL WITH Main Volume Descriptor Sequence) | |
| LSNall-207~LSNall-1 | — | Reserved | |
| LSNall | Anchor-3 | Anchor Volume Descriptor Pointer | |

FIG. 20

| LBN | Structure | Descriptors |
|---|---|---|
| 0~A | Space Bitmap | Space Bitmap Descriptor |
| A+1 | File Set Descriptor Sequence | File Set Descriptor (11) |
| A+2 | | Terminating Descriptor |
| A+3 | ICB for Root Directory | FE (Root Directory) (12) |
| A+4 | Root Directory | FID(parent directory) |
| | | FID(BDMV) (13) |
| | | FID(Resource) |
| | | FID(DATA1) |
| | | FID(DATA2) |
| A+5 | ICB for BDMV Directory | FE(BDMV) (14) |
| A+6 | ICB for Resource Directory | FE(Resource) |
| A+7 | ICB for DATA1 Directory | FE(DATA1) |
| A+8 | ICB for DATA2 Directory | FE(DATA2) |
| A+9 | BDMV Directory | FID(parent directory) |
| | | FID(Unit_Key_Gen_Value.inf) (15) |
| | | FID(CPS_CCI.inf) |
| | | ⋮ |
| | | FID(STREAM) |
| A+10 | ICBs for files/directories under BDMV Directory | FE(Unit_Key_Gen_Value.inf) (16) |
| A+11 | | FE(CPS_CCI.inf) |
| ⋮ | ⋮ | ⋮ |
| A+16 | | FE(STREAM) |

(17) TO STORAGE POSITION OF FILE DATA

FIG. 21A

```
Content_Certificate {                    THE NUMBER OF BYTES
    HEADER                                    1
    THE NUMBER OF HASH DIGESTS (n)            2
    THE NUMBER OF HASH UNITS                  4
    CONTENT PROVIDER ID                       2
    CONTENT ID                                4
    DISC FACTORY ID                           2
    For (i=0; i<n; i++) {
        HASH DIGEST (i)                      20
    }
    SIGNATURE                                40
}
```

FIG. 21B

- HEADER:
  - DATA INDICATING CONTENT CERTIFICATE.
- THE NUMBER OF HASH DIGESTS:
  - THE NUMBER OF DIGESTS OF HASH TABLE (= THE NUMBER OF CLIP FILES).
- THE NUMBER OF HASH UNITS:
  - THE TOTAL NUMBER OF HASH UNITS ON DISC.
- HASH DIGEST:
  - HASH VALUE OF HASH TABLE. FOR EXAMPLE, SHA-1 IS USED.
- SIGNATURE:
  - SIGNATURE FOR HEADER TO HASH DIGEST. FOR EXAMPLE, IT IS CALCULATED BY ECDSA USING SECRET KEY OF KEY MANAGEMENT ENTITY.

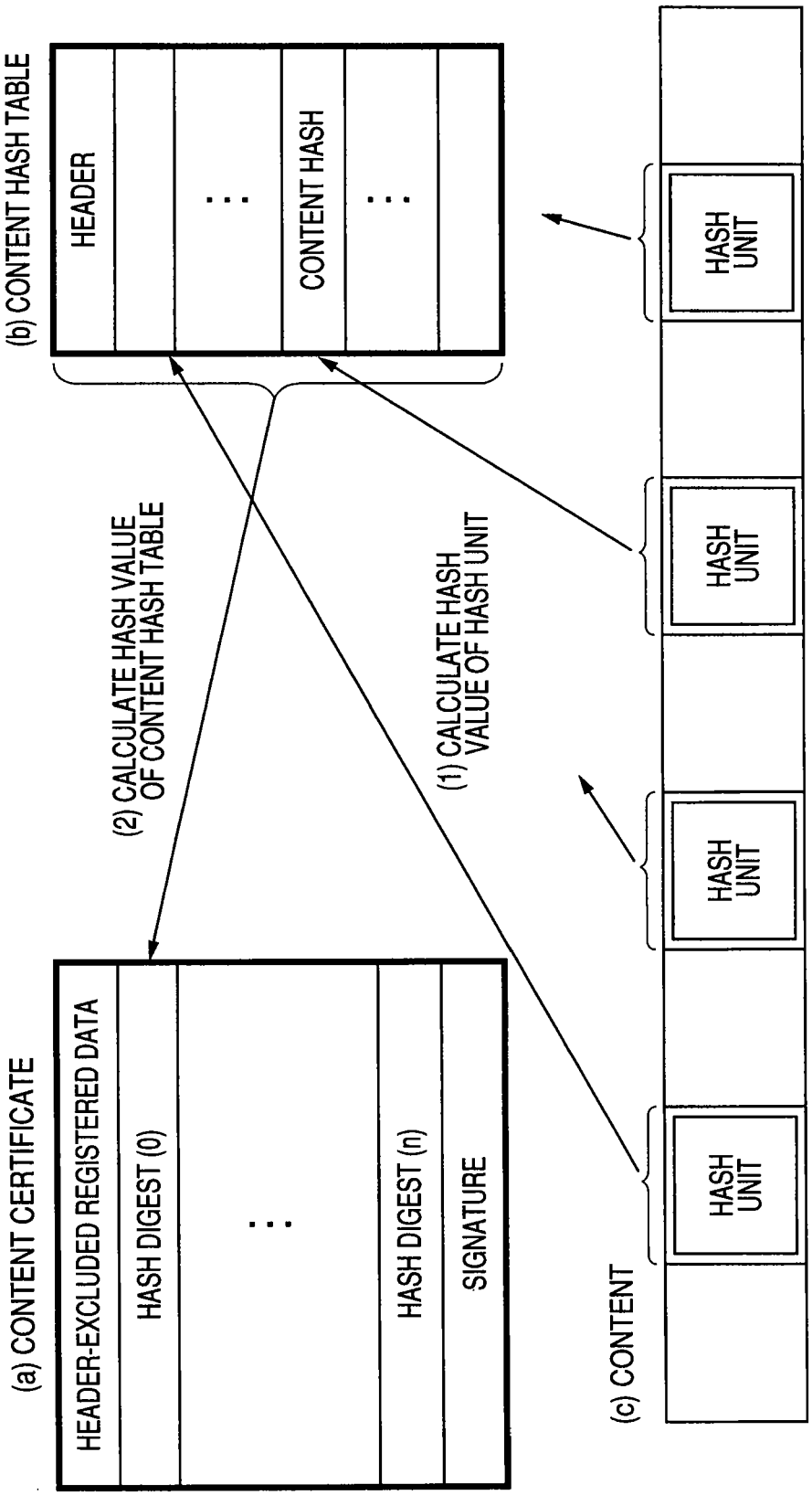

CONTENT CERTIFICATE

INFORMATION PROCESSING APPARATUS, INFORMATION RECORDING MEDIUM, APPARATUS AND METHOD OF MANUFACTURING INFORMATION RECORDING MEDIUM, AND COMPUTER PROGRAM

CROSS REFERENCES TO RELATED APPLICATIONS

The present application claims priority to Japanese Patent Application JP 2005-267532 filed in the Japanese Patent Office on Sep. 14, 2005, the entire contents of which being incorporated herein by reference.

BACKGROUND

The present disclosure relates to an information processing apparatus, an information recording medium, an apparatus and method of manufacturing an information recording medium, and a computer program. More specifically, the disclosure relates to an information processing apparatus that can execute a verification processing on various contents requiring content utilization management and prevent illegal utilization of contents, to an information recording medium, to an apparatus and method of manufacturing an information recording medium, and to a computer program.

Various kinds of software data (hereinafter, referred to as 'contents'), for example, audio data, such as music or the like, image data, such as movies or the like, game programs, and various application programs may be stored in recording mediums, for example, Blu-ray™ disc using a blue laser, DVD (Digital Versatile Disc), MD (Mini Disc), and CD (Compact Disc). In particular, Blu-ray™ disc using a blue laser is a high-density recordable disk, and can store mass movie contents as data having high image quality.

The digital contents are stored in various information recording mediums (recording mediums) and provided to a user. The user plays and utilizes the contents using his own play apparatus, such as a PC (personal computer) or a disk player.

Rights of distribution of various contents, such as music data and movie image data, are generally reserved to writers or sellers. Accordingly, upon distribution of the contents, there is a predetermined utilization limitation, that is, it is configured such that the utilization of the contents is permitted to a legal user, and unauthorized copying or the like is not performed.

According to a digital recording apparatus and a recording medium, recording and playing may be repeated without deteriorating images and sound, but there is a problem in that distribution of illegally copied contents through Internet, circulation of so-called pirated discs, in which the contents are copied to CD-R or the like, or utilization of copied contents stored in a hard disk of a PC or the like spreads.

In the DVDs or mass recording mediums, such as a recording medium using a blue laser, that are being recently developed, mass data for one or more movies may be recorded in one medium as digital information. As such, if movie information or the like may be recorded as digital information, it is important to prevent illegal copying so as to protect a copyright holder. Recently, in order to prevent illegal copying of digital data, various technologies for preventing illegal copying have been put to practical use in the digital recording apparatus and the recording medium.

For example, as for a DVD player, a content scramble system is adopted. In the content scramble system, encrypted video data or audio data is recorded in a DVD-ROM (Read Only Memory), and a key used for decrypting the encrypted data is given to a licensed DVD player. A license is given to a DVD player that is designed to follow a predetermined operation regulation so as not to perform illegal copying. Accordingly, the licensed DVD player uses the given key so as to decrypt the encrypted data recorded in the DVD-ROM and plays images or sound from the DVD-ROM.

Meanwhile, since an unlicensed DVD player does not have the key for decrypting the encrypted data, it cannot decrypt the encrypted data recorded in the DVD-ROM. As such, in the configuration of the content scramble system, a DVD player that does not meet the requirements upon licensing cannot play the DVD-ROM having recorded thereon digital data, thereby preventing illegal utilization.

As one method of preventing illegal utilization of the contents, there is suggested a control configuration that, in an information processing apparatus (play apparatus) that plays the contents, verifies presence/absence of revision of the contents, permits the play of the contents only when it is checked that the revision of the contents is absent, and does not play the contents when it is determined that the revision is present.

For example, in JP-A-2002-358011, there is disclosed a control configuration that calculates a hash value from a reserved contents file to be played, compares a prepared collation hash value, that is, a pre-calculated collation hash value on the basis of legal content data, and the calculated hash value, when the newly calculated hash value is consistent with the collation hash value, determines that the revision of the content is absent, and then progress a content play processing.

In addition, in JP-A-2002-251828, there is disclosed a configuration that calculates a hash on the basis of TOC (Table of Content) data to be recorded as content information, and uses the hash value as verification data.

However, when a processing of calculating the hash value on the basis of the content is executed in such a manner, if the size of content data as original data for the hash value calculation is large, a processing load and a processing time required for the calculation is significantly increased. In recent years, with the progress of high-quality motion picture data, there are many cases where one content has a size of several GB to tens GB. In order that a user's apparatus playing the contents is allowed to perform the hash value calculation processing based on such mass data, excessive data processing ability may be demanded for the user's apparatus. In addition, it may take much time required for verification of the content, and thus the content play processing may not be efficiently performed.

Further, with regards to verification processing based on the hash value, valid verification can be performed only on the content having the registered hash value. Accordingly, for example, when a pirated disc in which an illegal content illegally possessed is additionally recorded on the information recording medium having registered therein the hash value is circulated, even though a hash verification processing routine is executed, the hash verification processing may be executed as verification only for legal content whose hash value is registered, while the detection of the additionally recorded illegal content is not subject to verification. That is, since the detection of the illegal content by the hash verification is not executed, a function of preventing utilization of the illegal content cannot be sufficiently performed.

SUMMARY

There is a need for an information processing apparatus that can reliably execute a content verification processing upon content utilization of an information recording medium having stored therein various contents requiring copyright management and utilization management, an information recording medium, an apparatus and method of manufacturing an information recording medium, and a computer program.

There is also a need for an information processing apparatus that can detect illegally added content, a hash value of which is not registered, in a content verification processing to be executed upon play of a content stored in an information recording medium, thereby preventing utilization of illegal recording content like this, an information recording medium, an apparatus and method of manufacturing an information recording medium, and a computer program.

According to a first embodiment, an information processing apparatus includes content verification means that executes a verification processing of a recording content recorded on an information recording medium, and content play means that executes a content play processing on a condition that validity of the recording content is checked on the basis of the verification processing. The content verification means acquires from the information recording medium a content hash table having registered therein hash values generated on the basis of legal recording content data and executes a processing for verifying presence/absence of an illegal recording content whose hash value is not registered in the content hash table.

In the information processing apparatus according to the first embodiment, the content hash table may register a hash value for each hash unit having a prescribed data amount and the number of hash units corresponding to each content data file. The content verification means may verify consistency of a file size of a content data file of the information recording medium and the number of hash units corresponding to a content data file registered in the content hash table and verify presence/absence of the recording content whose hash value is not registered.

In the information processing apparatus according to the first embodiment, the content data file may be a clip file that is defined as a data file including contents. The content verification means may verify consistency of a file size of a clip file recorded on the information recording medium and the number of hash units corresponding to a clip file registered in the content hash table and verify presence/absence of the recording content whose hash value is not registered.

In the information processing apparatus according to the first embodiment, the content verification means may acquire the file size of the content data file recorded on the information recording medium from file system information recorded on the information recording medium.

In the information processing apparatus according to the first embodiment, the content verification means may select n hash units (where n is an integer of 1 or more), execute a collation processing of arithmetic hash values based on the selected hash units and a hash value stored in the content hash table, and execute the content verification processing on a condition that validity of the content is checked when collation of all the selected n hash values is established.

According to a second embodiment, an information processing apparatus includes content verification means that executes a verification processing of a recording content recorded on an information recording medium, and content play means that executes a content play processing on a condition that validity of the recording content is checked on the basis of the verification processing. The content verification means executes a revision verification processing of file system information recorded on the information recording medium as the content verification processing.

In the information processing apparatus according to the second embodiment, the content verification means may acquire electronic signature attached certificate data having stored therein a collation hash value generated on the basis of the file system information from the information recording medium, and acquire the collation hash value after signature verification of the certificate data so as to execute a collation processing with a hash value calculated on the basis of the file system information read out from the information recording medium.

In the information processing apparatus according to the second embodiment, the certificate having stored therein the collation hash value may be a content certificate having stored therein verification data corresponding to the content hash table, in which a hash value generated on the basis of legal recording content data is stored. The content verification means may check validity of the content certificate on the basis of signature verification of the content certificate, and perform an acquisition processing of the collation hash value from the content certificate whose validity is checked.

In the information processing apparatus according to the second embodiment, the content verification means may select n hash units (where n is an integer of 1 or more), execute a collation processing of arithmetic hash values based on the selected hash units and a hash value stored in the content hash table, and execute the content verification processing on a condition that validity of the content is checked when collation of all the selected n hash values is established.

According to a third embodiment, there is provided an information recording medium that has file system information corresponding to a recording content of the information recording medium and a hash value based on the file system information as recording information.

In the information recording medium according to the third embodiment of the invention, the hash value may be stored in a content certificate having stored therein verification data corresponding to a content hash table, in which hash values generated on the basis of recording content data of the information recording medium are registered.

According to a fourth embodiment, an apparatus for manufacturing an information recording medium includes file system information generating means that generates file system information corresponding to a recording content of an information recording medium, hash value calculating means that calculates a hash value of the file system information, and recording means that records the file system information and the hash value on the information recording medium.

The apparatus for manufacturing an information recording medium according to the fourth embodiment may further include content hash table generating means that generates a content hash table having registered therein the hash value generated on the basis of the recording content data of the information recording medium, and content certificate generating means that generates verification data of the content hash table and a content certificate having the hash value of the file system information as registration information. The recording means records the content hash table and the content certificate on the information recording medium.

According to a fifth embodiment, an information processing method includes executing a verification processing of a recording content recorded on an information recording medium, and executing a content play processing on a condition that validity of the recording content is checked on the basis of the verification processing. The step of executing the verification processing acquires a content hash table having registered therein hash values generated on the basis of legal recording content data, and executes a processing of verifying presence/absence of illegal recording content whose hash value is not registered in the content hash table.

In the information processing method according to the fifth embodiment, the content hash table may register a hash value for each hash unit having a prescribed data amount and the number of hash units corresponding to each content data file. The step of executing the verification processing may verify consistency of a file size of a content data file of the information recording medium and the number of hash units corresponding to a content data file registered in the content hash table and verify presence/absence of the recording content whose hash value is not registered.

In the information processing method according to the fifth embodiment, the content data file may be a clip file that is defined as a data file including contents. The step of executing the verification processing may verify consistency of a file size of a clip file recorded on the information recording medium and the number of hash units corresponding to a clip file registered in the content hash table and verify presence/ absence of the recording content whose hash value is not registered.

In the information processing method according to the fifth embodiment, the step of executing the verification processing may acquire the file size of the content data file recorded on the information recording medium from file system information recorded on the information recording medium.

The information processing method according to the fifth embodiment may further includes a step of selecting n hash units (where n is an integer of 1 or more), executing a collation processing of arithmetic hash values based on the selected hash units and a hash value stored in the content hash table, and executing the content verification processing on a condition that validity of the content is checked when collation of all the selected n hash values is established.

According to a sixth embodiment, an information processing method includes executing a verification processing of a recording content recorded on an information recording medium, and executing a content play processing on a condition that validity of the recording content is checked on the basis of the verification processing. The step of executing the verification processing executes a revision verification processing of file system information recorded on the information recording medium as the content verification processing.

In the information processing method according to the sixth embodiment, the step of executing the verification processing may acquire electronic signature attached certificate data having stored therein a collation hash value generated on the basis of the file system information from the information recording medium, and acquire the collation hash value after signature verification of the certificate data so as to execute a collation processing with a hash value calculated on the basis of the file system information read out from the information recording medium.

In the information processing method according to the sixth embodiment, the certificate having stored therein the collation hash value may be a content certificate having stored therein verification data corresponding to the content hash table, in which a hash value generated on the basis of legal recording content data is stored. The step of executing the verification processing may check validity of the content certificate on the basis of signature verification of the content certificate and perform an acquisition processing of the collation hash value from the content certificate whose validity is checked.

The information processing method according to the sixth embodiment may further include selecting n hash units (where n is an integer of 1 or more), executing a collation processing of arithmetic hash values based on the selected hash units and a hash value stored in the content hash table, and executing the content verification processing on a condition that validity of the content is checked when collation of all the selected n hash values is established.

According to a seventh embodiment, a method of manufacturing an information recording medium includes generating file system information corresponding to a recording content of an information recording medium, calculating a hash value of the file system information, and recording the file system information and the hash value on the information recording medium.

In the method of manufacturing an information recording medium according to the seventh embodiment may further include generating a content hash table having registered therein the hash value generated on the basis of the recording content data of the information recording medium, and generating verification data of the content hash table and a content certificate having the hash value of the file system information as registration information. The step of recording records the content hash table and the content certificate on the information recording medium.

According to an eighth embodiment, a computer program is provided that causes an information processing apparatus to execute a verification processing of a recording content recorded on an information recording medium. The computer program includes the steps of executing a verification processing of a recording content recorded on an information recording medium, and executing a content play processing on a condition that validity of the recording content is checked on the basis of the verification processing. The step of executing the verification processing acquires a content hash table having registered therein hash values generated on the basis of legal recording content data, and executes a processing of verifying presence/absence of illegal recording content whose hash value is not registered in the content hash table.

According to a ninth embodiment, a computer program is provided that causes an information processing apparatus to execute a verification processing of a recording content recorded on an information recording medium. The computer program includes the steps of executing a verification processing of a recording content recorded on an information recording medium, and executing a content play processing on a condition that validity of the recording content is checked on the basis of the verification processing. The step of executing the verification processing executes a revision verification processing of file system information recorded on the information recording medium as the content verification processing.

Moreover, the computer program according to the embodiment is, for example, a computer program that can be provided to a computer system capable of executing various program codes by computer-readable storage mediums or communication mediums, for example, recording mediums, such as CD, FD, or MO, or communication mediums, such as a network. Since the program is provided in a computer-readable format, a processing according to the program is executed on the computer system.

Other features and advantages will be apparent from the detailed description based on the embodiments of the invention described below and the accompanying drawings. Moreover, in this specification, a system refers to a logical group of a plurality of devices, but the devices having different configurations are not necessarily provided in the same casing.

According to the configuration of an embodiment, presence/absence of the illegal recording content, the hash value of which is not registered, is verified on the basis of the registration information of the content hash table, in which the hash values generated on the basis of the legal recording content data is registered. Therefore, it is possible to prevent illegal utilization of an illegally added and recorded content. For example, with the verification of consistency of the file size of the content data file of the information recording medium and the number of hash units corresponding to the content data file registered in the content hash table, presence/absence of a recording content whose hash value is not registered is verified. As a result, an efficient verification processing can be implemented.

According to the configuration of an embodiment, with the revision verification processing of the file system information registered in the information recording medium, illegal utilization of an illegally added and recorded content can be prevented. For example, the collation hash value generated on the basis of the file system information is acquired from the electronic signature attached content certificate, and the collation hash value is acquired after signature verification of the content certificate, so as to execute the collation processing of the collation hash value and the hash value calculated on the basis of the file system information read out from the information recording medium. As a result, reliable content verification can be performed.

Additional features and advantages are described herein, and will be apparent from, the following Detailed Description and the figures.

BRIEF DESCRIPTION OF THE FIGURES

FIG. 3 is a diagram showing an example of the configuration of a content management unit and a unit key management table;

FIG. 10 is a diagram illustrating an example of the configuration of a content hash table;

FIG. 19 is a diagram illustrating a file access sequence when a UDF (Universal Disc Format) file system is applied;

FIG. 20 is a diagram illustrating a file access sequence when a UDF (Universal Disc Format) file system is applied;

FIG. 21 is a diagram illustrating an example of the data configuration of a content certificate;

FIG. 22 is a diagram illustrating the details of the data configuration of the content certificate;

DETAILED DESCRIPTION

Hereinafter, the details of an information processing apparatus, an information recording medium, a content management system, a data processing method, and a computer program will be described with reference to the drawings. Moreover, the descriptions will be given according to the following contents.

1. Configuration of Stored Data in Information Recording Medium
2. Configuration of Encryption and Utilization Management of Stored Content
3. Configuration of Data Recording, Configuration of Encryption, and Details of Content Hash in Information Recording Medium
4. Content Verification Processing based on Recorded Information of Content Hash Table
5. Content Verification Processing based on Verification of File System Information
6. Processing of Manufacturing Information Recording Medium having stored therein Verification Value of File System Information
7. Example of Configuration of Information Processing Apparatus

1. Configuration of Stored Data in Information Recording Medium

Figure 1:
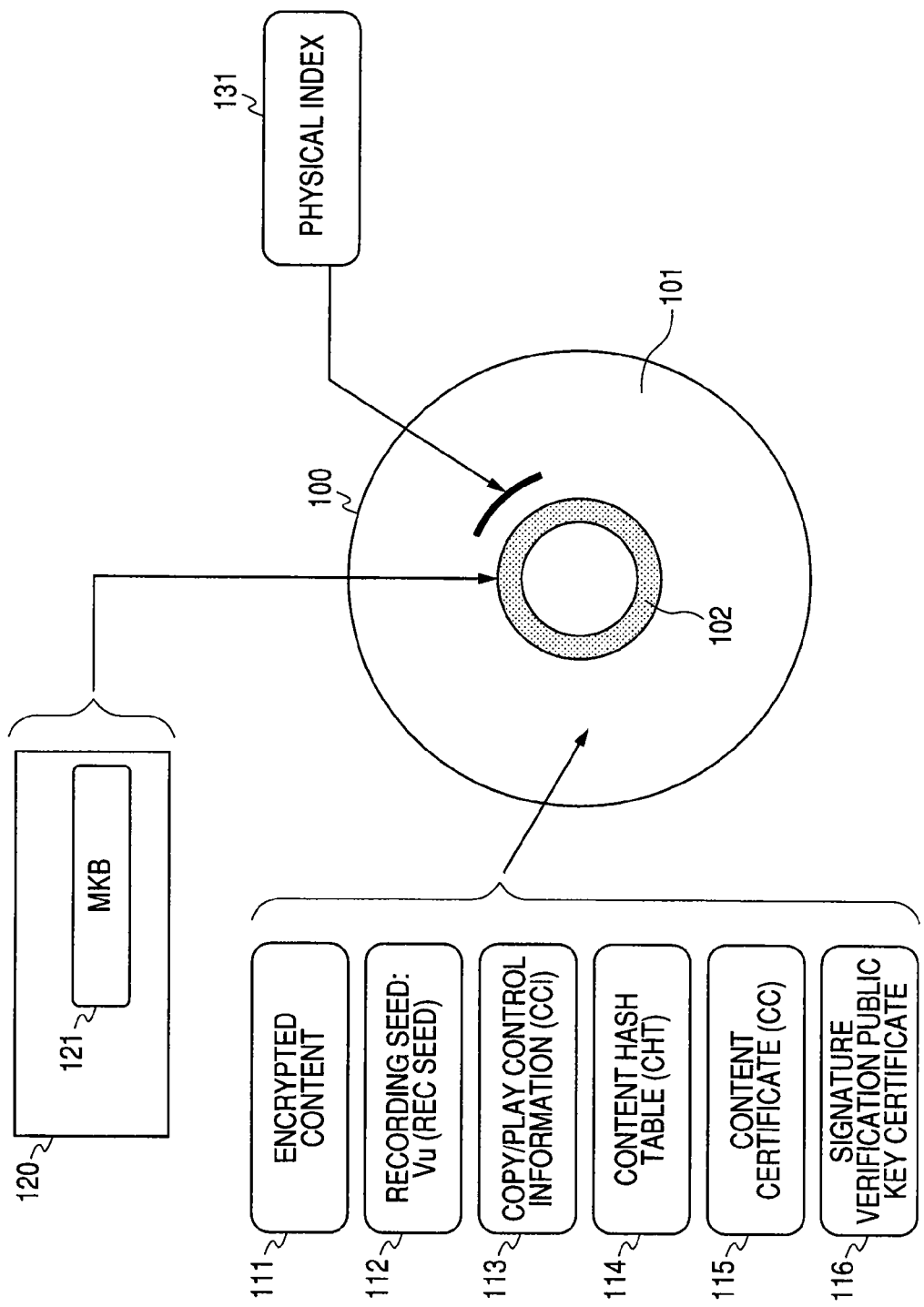
FIG. 1 is a diagram illustrating the configuration of stored data in an information recording medium.

First, the configuration of stored data in an information recording medium will be described. FIG. 1 shows an example of an information recording medium having stored therein contents, to which a processing according to an embodiment of the invention can be applied. Here, an example where information of a ROM disc as a disc having stored therein the contents is stored is shown.

The ROM disc is an information recording medium, such as Blu-ray™ disc, and DVD, that is manufactured in a disc manufacturing facility under the authorization of a content right holder, who holds a legal content copyright or a distribution right, and in which legal contents are stored. Moreover, in the following embodiments, a disc type medium is exemplified as an example of an information recording medium, but the invention may be applied to a configuration using various information recording mediums.

As shown in FIG. 1, an information recording medium 100 has a data storage region 101, in which data, such as contents, is stored, and a read-in region 102, in which supplementary information corresponding to a disc and stored contents or key information to be applied to a decryption processing of a content is stored.

In the data storage region 101, an encrypted content 111, a recording seed (REC SEED) 112 as information required for generation of a key to be applied to a decryption processing of the encrypted content, CCI (Copy Control Information) 113 as copy/play control information of a content, a content hash 114 as a hash value of a content to be applied to revision verification of a content, a content certificate (CC) 115 that indicates validity of a content, and a signature verification public key certificate 116 in which a public key to be applied to verification of an electronic signature attached to the content certificate (CC) is stored. The content hash 114 is stored as a content hash table (CHT). The details of the content hash table (CHT) will be described below. Moreover, the recording seed (REC SEED) 112, the CCI (Copy Control Information) 113, and the content hash 114 are used as generation information of an encryption key (unit key) to be applied to encryption and decryption of the content. The detailed configuration will be described below.

In the read-in region 102, encryption key information 120 required for generation of a key to be applied to a decryption processing of the encrypted content 111 is stored. The encryption key information 120 includes a media key block (MKB) 121 as an encrypted key block generated on the basis of a key distribution system having a tree structure that is known as one of a broadcast encryption system. In addition, a physical index 131 is recorded in the information recording medium 100. Hereinafter, the outlines of various kinds of information will be described.

(1) Encrypted Content 111

Various contents are stored in the information recording medium 100. For example, an AV (Audio Visual) stream of a motion picture content, such as an HD (high-definition) movie content, which is high-definition motion picture data, a game program having a format defined by a specified standard, an image file, sound data, and text data are used as main contents. These contents are specified AV format standard data, and are stored according to a specified AV data format. Specifically, for example, the contents are stored as Blu-ray™ disc ROM standard data according to a Blu-ray™ disc ROM standard format.

In addition, for example, a game program, an image file, sound data, and text data as service data may be stored as sub contents. The sub contents are data having a data format different from the specified AV data format. That is, the sub contents may be stored in an arbitrary format different from the Blu-ray™ disc ROM standard format as data other than the Blu-ray™ disc ROM standard.

In addition to the main contents and the sub contents, the kinds of contents include various contents, for example, music data, image data, such as motion pictures or still pictures, game programs, and WEB browsers. These contents include various kinds of information, such as content information that can be used by only data from the information recording medium 100, data from the information recording medium 100, and content information that can be used along with data provided from a networked server.

(2) Recording Seed 112

For content utilization management, each content or a combination of a plurality of contents is subject to encryption using an individual encryption key (unit key) and then stored in the information recording medium 100. That is, AV (Audio Visual) streams, music data, image data, such as motion pictures or still pictures, game programs, and WEB browsers, which constitute the content are divided into units as a unit of content utilization management, and a different recording seed: Vu 112 is allocated for each divided unit.

Upon the content utilization, an encryption key (unit key) corresponding to each unit is allocated according to a predetermined encryption key generation sequence using the recording seed: Vu 112 and the encryption key information 120. A unit for allocating one unit key is called a content management unit (CPS unit). That is, the encrypted content 111 is divided on the basis of the CPS unit, then is encrypted by a unit key corresponding to each CPS unit, and subsequently is stored in the information recording medium 100.

(3) Copy/Play Control Information (CCI) 113

The copy/play control information (CCI) 113 is copy control information or play control information for utilization control corresponding to the encrypted content 111 stored in the information recording medium 100. The copy/play control information (CCI) 113 may be set in various manners. For example, the copy/play control information (CCI) 113 may be set as information of each CPS unit or may be set corresponding to a plurality of CPS units. The details of this information is described below.

(4) Content Hash 114

The content hash 114 is a hash value based on configuration data of the content stored in the information recording medium 100 or the encrypted content and is applied to content revision verification. In the configuration of one embodiment, a clip file as AV stream actual data constituting the CPS unit is segmentalized, a hash unit of a predetermined data unit (for example, 192 KB) is set, a hash value for each hash unit is calculated, and the hash value on the basis of the hash unit is recorded in the content hash table (CHT) and stored in the information recording medium 100.

In an information processing apparatus (play apparatus) that play the contents from the information recording medium, the hash value based on the hash unit is calculated, and the calculated hash value and a collation hash value of a corresponding hash unit recorded in the content hash table (CHT) stored in the information recording medium are compared with each other. If both are consistent with each other, it is determined that content revision is absent, and the decryption and play processing of the content progresses. If both are inconsistent with each other, it is determined that content revision is present, and the decryption and play processing of the content stops. The details of these processings will be described below.

Moreover, the content hash is data that is also used as generation information of the encryption key applied to the encryption processing and the decryption processing of the content. The generation and utilization of the content hash 114 will be described below.

(5) Content Certificate

The content certificate (CC) is a certificate that indicates validity of the content stored in the information recording medium. Data, such as a content hash digest based on the collation hash unit stored in the above-described content hash table (CHT), is stored in the content certificate, and an electronic signature is additionally attached thereto. For example, an electronic signature, such as an information recording medium manufacturing entity as a disc factory, is attached thereto, thereby forming revision-prevention data. The details of the content certificate will be described below.

(6) Signature Verification Public Key Certificate

The signature verification public key certificate is a public key certificate that stores a public key applied to verification of an electronic signature, such as an information recording medium manufacturing entity, attached to the content certificate.

(7) Physical Index 131

In the physical index 131, category information of the information recording medium, for example, disc supplementary information, such as the kind of disc, content supplementary information corresponding to the content stored in the data storage region 101 are recorded. In addition, like the recording seed 112, key information (key generation information) for generating a key applied to the decryption processing of the encrypted content stored in the data storage region 101 of the information recording medium may be recorded. Moreover, the physical index 113 may be recorded in the read-in region 102.

(8) Encryption Key Information 120

Like the above-described recording seed 112, the encryption key information 120 includes an encryption key block for acquiring key information (key generation information) for generating a key applied to the decryption processing of the encrypted content stored in the data storage region 101 of the information recording medium, that is, a media key block (MKB) 121 as an encryption key block generated on the basis of a key distribution system having a tree structure that is known as one of a broadcast encryption system.

The MKB 121 is a key information block that allows a media key (Km) as a key required for the decryption of the content to be acquired only by a processing (decryption) based on a device key stored in an information processing apparatus of a user having a valid license. This allows the key acquisition by an information distribution system according to a hierarchical tree structure only when a user device (information processing apparatus) has a valid license. Meanwhile, the key (media key) acquisition of an invalidated (revoke processing) user device is obstructed. A management center may generate an MKB having a configuration that cannot decrypt by a device key stored in a specified user device, that is, a configuration that cannot acquire a media key required for content decryption, by a change of the key information stored in the MKB. Accordingly, an illegal device is excluded (revoked) at an arbitrary timing, and thus an encrypted content that can be decrypted by a device having a valid license can be provided.

2. Configuration of Encryption and Utilization Management of Stored Content

Next, the configuration of content management that divides the contents stored in the information recording medium and realizes a different utilization control for each divided content is described with reference to FIG. 2.

As described above, as regards the contents stored in the information recording medium, a different key (unit key) is allocated to each divided content in order to realize a different utilization control for each divided content. Then, the contents are encrypted and stored. A unit allocating one unit key is called a content management unit (CPS unit).

The content belonging to each unit is encrypted using each unit key and, upon the content utilization, the key (unit key) allocated to each unit is acquired and the play is performed. The unit keys may be individually managed. For example, a unit key allocated to a unit A is set as a key that can be acquired from the information recording medium. Further, a unit key allocated to a unit B is set as a key that can be acquired on a condition that a user accesses a networked server and executes a predetermined procedure. That is, the configuration of the acquisition and management of the key corresponding to each unit may be independently set for the individual unit keys.

The setting of a unit allocating one key, that is, a content management unit (CPS unit), will be described with reference to FIG. 2.

Figure 2:
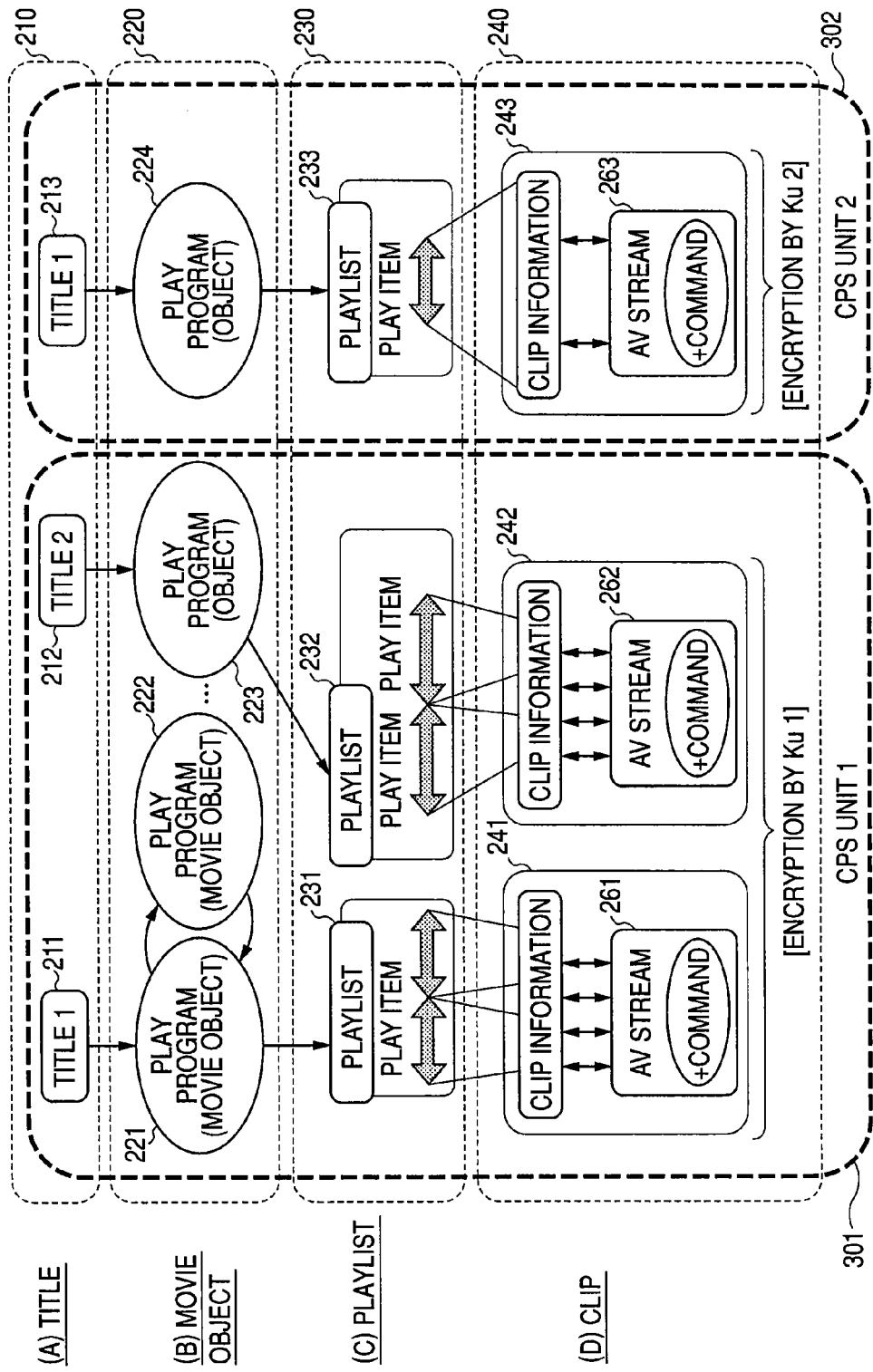
FIG. 2 is a diagram illustrating a setting example of content management units that are set for contents stored in an information recording medium.

As shown in FIG. 2, the content has a hierarchy of (A) title 210, (B) movie object 220, (C) playlist 230, and (D) clip 240. When a title is assigned as an index file accessed by a play application, a play program associated with the title is assigned, a playlist that defines a content play sequence and the like on the basis of program information of the assigned play program is selected, an AV stream or a command as content actual data is read out by clip information defined in the playlist, and then the play of the AV stream or the execution of the command is performed.

FIG. 2 shows two CPS units. These constitute a portion of the content stored in the information recording medium. Each of a CPS unit 1 301 and a CPS unit 2 302 is a CPS unit that is set as a unit including a title as an application index, a movie object as a play program file, a playlist, and a clip having an AV stream file as content actual data.

In the content management unit (CPS unit) 1 301, a title 1 211, a title 2 212, play programs 221 and 222, playlists 231 and 232, and clips 241 and 242 are included. AV stream data files 261 and 262 as content actual data included in the two clips 241 and 242 are encrypted using a unit key: Ku1 as an encryption key set in association with the content management unit (CPS unit) 1 301.

In the content management unit (CPS unit) 2 302, a title 3 213, a play program 224, a playlist 233, and a clip 243 are included. An AV stream data file 263 as content actual data included in the clip 243 is encrypted using a unit key: Ku2 as an encryption key set in association with the content management unit (CPS unit) 2 302.

For example, in order for a user to play an application file or a content corresponding to the content management unit 1 301, it is necessary to acquire the unit key: Ku1 as the encryption key set in association with the content management unit (CPS unit) 1 301 and to execute the decryption processing. After the decryption processing, an application program is executed so as to play the content. In order to play an application file or a content corresponding to the content management unit 2 302, it is necessary to acquire the unit key: Ku2 set in association with the content management unit (CPS unit) 2 302 and to execute the decryption processing.

The play application program executed in the information processing apparatus that plays the content identifies the content management unit (CPS unit) corresponding to the play content assigned by the user and executes the acquisition processing of the CPS encryption key corresponding to information of the identified content management unit (CPS unit). When the CPS encryption key cannot be acquired, display of a message indicating nonplayable and the like is performed. Further, the play application program detects switching of the content management unit (CPS unit) upon the play of the content, and performs acquisition of a required key, display of a message indicating nonplayable and the like.

The play application program executes play management based on a unit configuration and unit key management table shown in FIG. 3. As shown in FIG. 3, the unit configuration and unit key management table is a table in which the content management unit (CPS unit) corresponding to an index, an application file, or a data table is associated with unit key information. The play application program performs management based on the management table.

For example, when detecting switching of the content management unit (CPS unit) by switching of the application index, the play application program switches the key to be applied by switching of the content management unit (CPS unit). Alternatively, the play application program executes a processing, such as display of a message indicating that the acquisition of the unit key is required.

For example, if the unit key Ku1 of the content management unit (CPS unit) 1 301 and the unit key Ku2 of the content management unit (CPS unit) 2 302 are stored in the play apparatus that plays the content, when detecting switching between the units of the application or switching of the content, the play application program that generally controls the content play processing performs switching of the unit key corresponding to switching of the content management unit (CPS unit), that is, performs switching from Ku1 to Ku2.

Further, if the unit key Ku1 of the content management unit (CPS unit) 1 301 is stored in the play apparatus that plays the content, while the unit key Ku2 of the content management unit (CPS unit) 2 302 is not stored therein, when detecting switching between the units of the application or switching of the content, the play application program that generally controls the content play processing performs a processing such as the display of the message indicating that the acquisition of the unit key is required.

Figure 4:
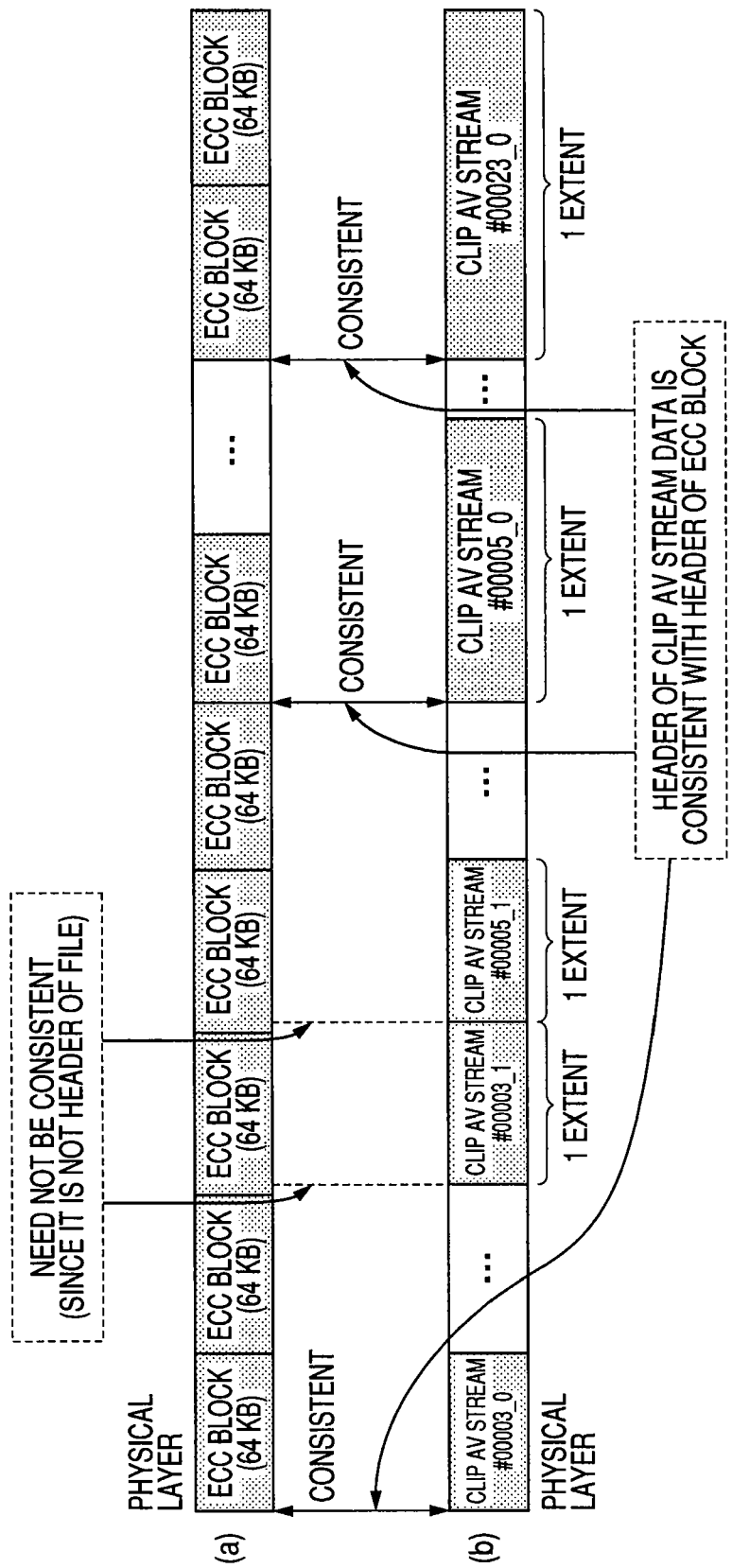
FIG. 4 is a diagram illustrating the configuration of data recording of an information recording medium, which illustrates correspondence of ECC blocks and clip AV streams in a physical layer.

3. Details of Configuration of Data Recording, Configuration of Encryption, and Content Hash in Information Recording Medium Next, details of the data recording configuration, the encryption configuration, and the content hash of the information recording medium will be described. First, the correspondence of clip files and ECC blocks will be described with reference to FIG. 4. Data to be stored in the information recording medium is recorded in an ECC block unit as the minimum data recording and playing unit of a drive that records and plays the content. In this example, as shown in (*a*) of FIG. 4, the ECC block is set as data of 64 KB. In FIG. 4, (*a*) shows the data recording configuration in a physical layer, and (*b*) shows clip files as recording contents corresponding to the physical layer.

As described with reference to FIG. 2, as for the content, a clip file is set as a management unit. In FIG. 4, (*b*) shows an example of the configuration, in which a plurality of clip files are recorded as clip AV streams:

Clip No.=#00003
Clip No.=#00005
Clip No.=#00023

In the example in the drawing, the clip files of the clips: #00001 to #00023 are stored in the information recording medium. Each clip is segmentalized, and the segmentalized data is distributed and recorded in one continuous recording region (Extent) managed by a UDF (Universal Disc Format) as data #000*nn__x*.

In the data recording configuration of the information recording medium of one embodiment of the invention, data [#000*nn*_0], which is header data of each clip, that is, header data of AV stream data of the clip file, is recorded to be aligned with the header of the ECC block (64 KB) in the physical layer. The reason is that reading of the hash unit set corresponding to each clip file or calculation of the hash value from the hash unit can be efficiently executed. These processings will be described below in detail.

In this embodiment, only data [#000*nn*_0], which is the header data of the AV stream data of the clip file is recorded to be aligned with the header of the ECC block (64 KB) in the physical layer. Subsequent data [#000*nn*_1 . . . ] are not necessarily aligned with the header of the ECC block. However, all continuous recording region (Extent) data may be recorded such that the header is aligned with the header of the ECC block. With this configuration, the calculation of the hash value can be further efficiently performed.

Next, correspondence of the clip files and the hash units will be described with reference to FIG. 5. As described above, the content hash 114 as the stored data of the information recording medium 100 described with reference to FIG. 1 is a hash value based on configuration data of the content stored in the information recording medium 100 or the encrypted content and is applied to the content revision verification. In the configuration of one embodiment of the invention, the clip file as AV stream actual data constituting the CPS unit is segmentalized, a hash unit of a predetermined data unit (for example, 192 KB) is set, a hash value of each hash unit is calculated, and the hash value for each hash unit is recorded in the content hash table (CHT) and stored in the information recording medium.

Figure 5:
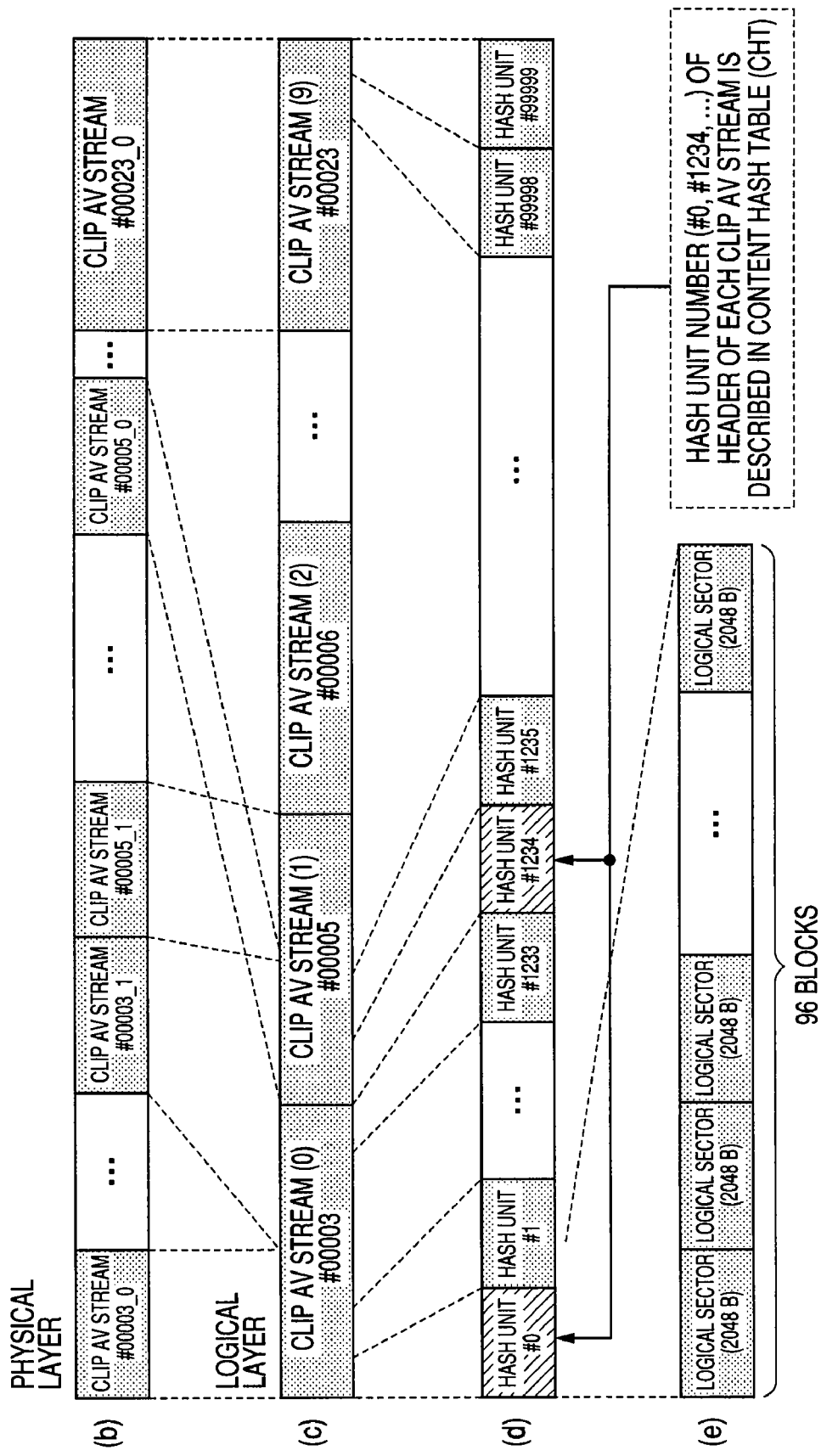
FIG. 5 is a diagram illustrating the configuration of data recording of an information recording medium, which illustrates correspondence of clip AV streams in a physical layer, clip AV streams in a logical layer, and hash units.

In FIG. 5, (b) shown on the uppermost side shows the arrangement of the clip files in the physical layer corresponding to (b) shown in FIG. 4. As described above, the configuration data of each clip file can be segmentalized, distributed, and recorded in the information recording medium. As shown in (c) of FIG. 5, the distributed data is managed for each clip file in the physical layer. In the information processing apparatus that executes the content play processing, the play application reads out the configuration data of the clip file distributed and recorded in the information recording medium according to an address so as to constitute one clip file on the physical layer, and executes the data decryption processing and the play processing.

In the information processing apparatus that executes the content play processing, the play application executes the content revision verification. For example, the content revision verification randomly selects a plurality of hash units from the clip file selected as an object to be played, calculates the hash values of content data corresponding to the selected hash units, and compares the calculated hash values and the stored value (collation hash value) of the content hash table (CHT) recorded in the information recording medium in advance. When the values are consistent with each other, it is determined that content revision is absent, and the decryption and play processing of the content progresses. If the values are inconsistent with each other, it is determined that content revision is present, and the decryption and play processing of the content stops.

As shown in (d) of FIG. 5, the hash unit is set on the basis of the data unit (192 KB) obtained by segmentalizing the clip file in the logical layer. As shown in (e) of FIG. 5, each hash unit corresponds to data of 96 logical sectors (2048 B).

As shown in (d) of FIG. 5, for the hash units set corresponding to the individual clip files, hash unit numbers #0, #1, #2, . . . are set. FIG. 5 shows an example of the configuration, in which the hash units #0 to #1233 are included in the clip file #00003, and the hash units #1234 . . . are included in the clip file #00005.

In the content hash table (CHT) stored in the information recording medium, the hash value (collation hash value) of each hash unit is stored, and the hash unit number of the header of the clip file is stored. With this configuration, the information processing apparatus (play apparatus) that executes hash value verification can efficiently select the hash unit to be verified corresponding to the clip to be played on the basis of the hash unit number of the header of the clip file recorded in the content hash table (CHT). The configuration of the content hash table (CHT) and the details of the processing using the CHT will be described below.

Figure 6:
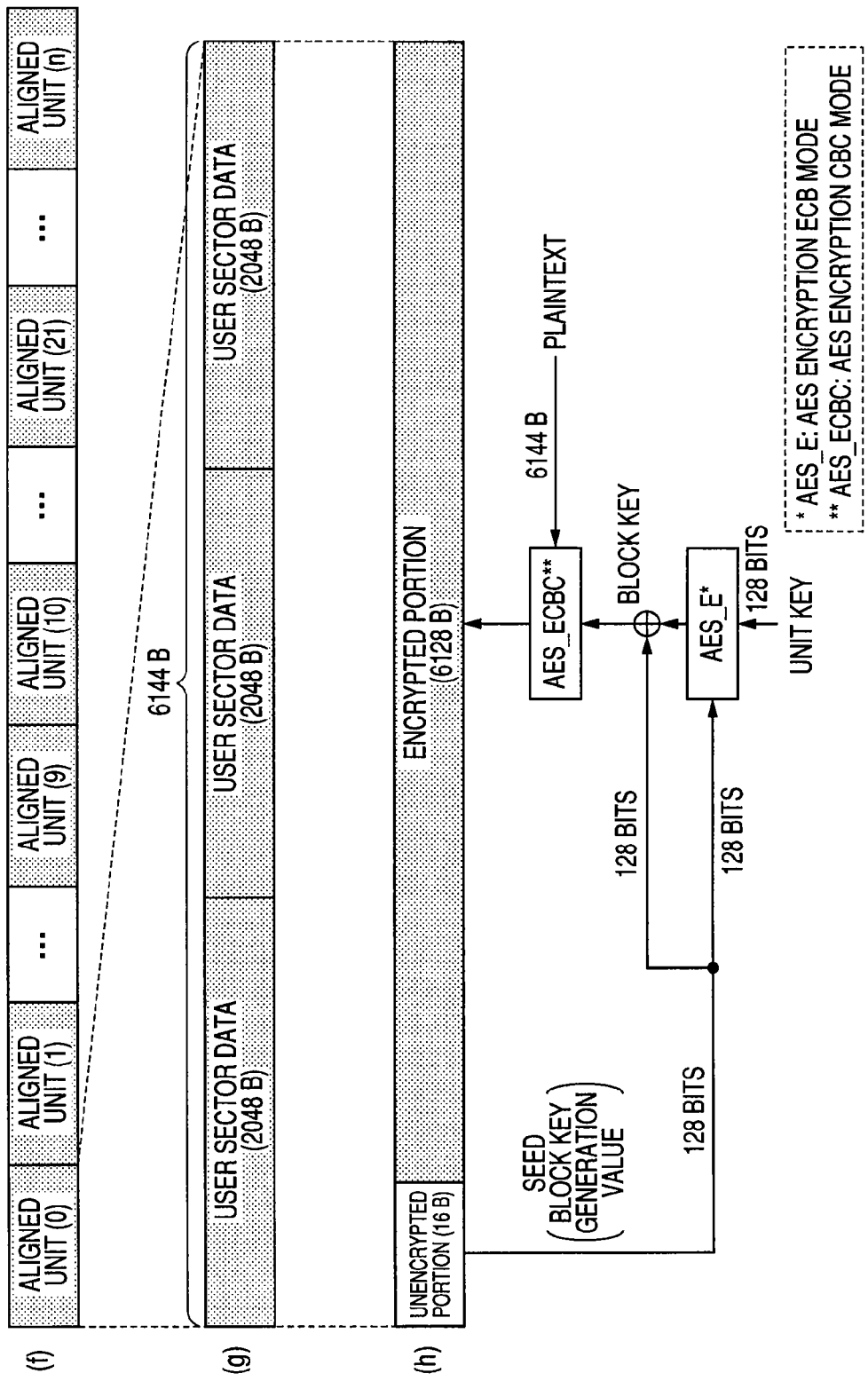
FIG. 6 is a diagram illustrating the configuration of data recording of an information recording medium and an encryption processing.

FIG. 6 is a diagram illustrating the configuration of an encryption processing of data to be stored in the information recording medium. The encryption of the content is executed in units of an aligned unit set as an encryption processing unit shown in (f) of FIG. 6. As shown in (g) of FIG. 6, one encryption processing unit (Aligned unit) has three sector data (2048 B (byte)) of 6144 B (byte). One sector data corresponds to one sector data in (e) of FIG. 5.

As shown in (h) of FIG. 6, one encryption processing unit (Aligned unit) has a 16-byte non-encrypted portion and a 6128-byte encrypted portion. A seed as a block key generation value is acquired from the non-encrypted portion. Then, a block key is generated by an encryption processing (AES_E) and an exclusive OR operation of the seed and the unit key generated on the basis of various information, such as the media key acquired from the media key block described with reference to FIG. 1, and an encryption processing (AES_ECBC) is executed on a plaintext, thereby generating 6128-byte encrypted data.

The encryption processing using the block key is executed using a CBC mode of an AES encryption algorithm. The encryption processing will be described with reference to FIG. 7.

Figure 7:
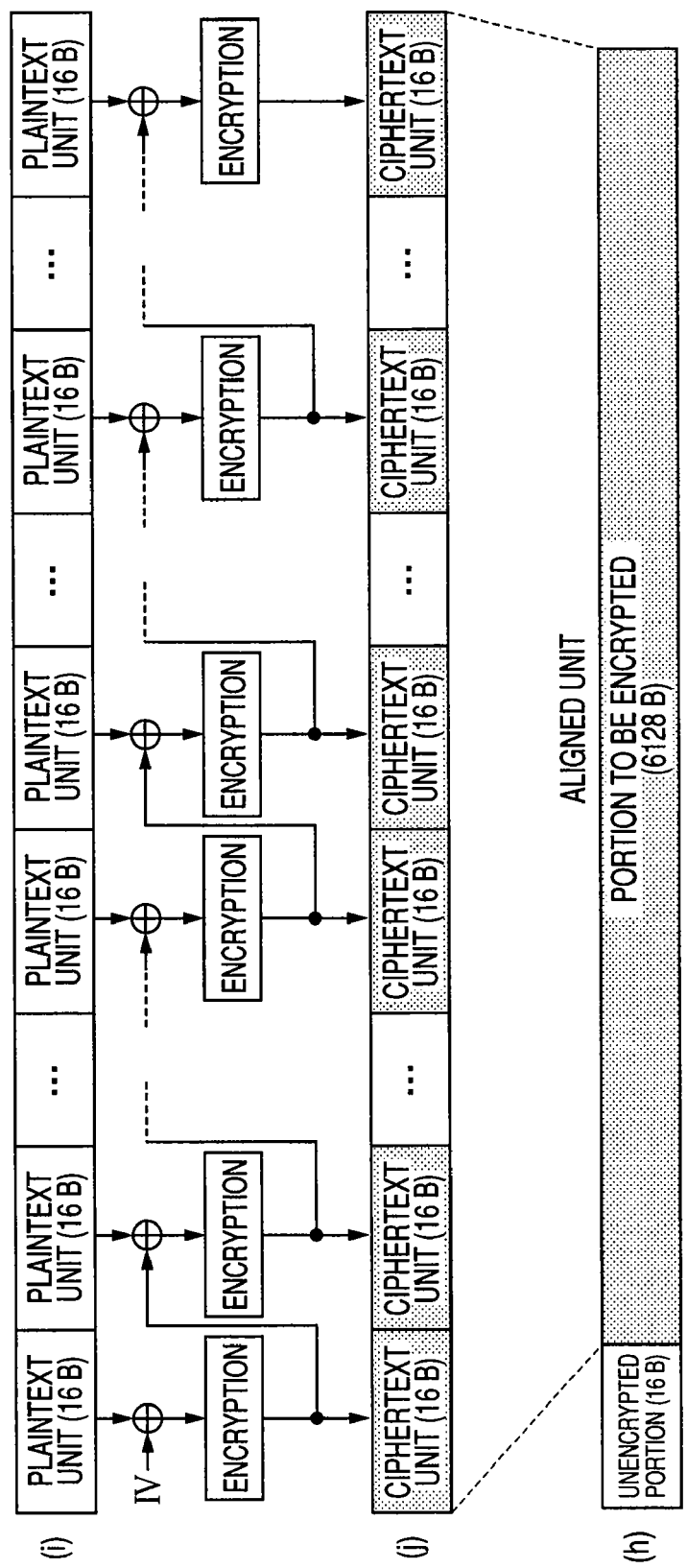
FIG. 7 is a diagram illustrating the configuration of an encryption processing of contents stored in an information recording medium.

In FIG. 7, (i) shows a plaintext of the content to be stored in the information recording medium. The plaintext is divided in units of 16 bytes, and the encryption of each divided block is executed through an exclusive OR operation and an encryption unit (AES). An exclusive OR operation of the result data and subsequent 16-byte data is executed, and then the AES encryption is executed. These are repeatedly executed. In connection with the output of the encryption unit (AES), encrypted data shown in (j) of FIG. 7 is generated. The encrypted data is data shown in (h) of FIG. 7, and this is the same as data shown in (h) of FIG. 6. This becomes a 6128-byte encrypted portion of one encryption processing unit (Aligned unit) having three 2048-byte sector data. Moreover, an initial value (IV) that is subject to the exclusive OR operation together with the 16-byte plaintext unit of the header is the seed acquired from the non-encrypted portion shown in (h) of FIG. 6.

The encrypted data generated in such a manner is divided into the ECC blocks and stored in the information recording medium. Moreover, in the information processing apparatus (play apparatus) that executes the content play processing, the same decryption processing as the CBC mode according to the AES encryption algorithm shown in FIG. 7, and a processing of generating decrypted data (plaintext) from the encrypted data is executed.

Figure 8:
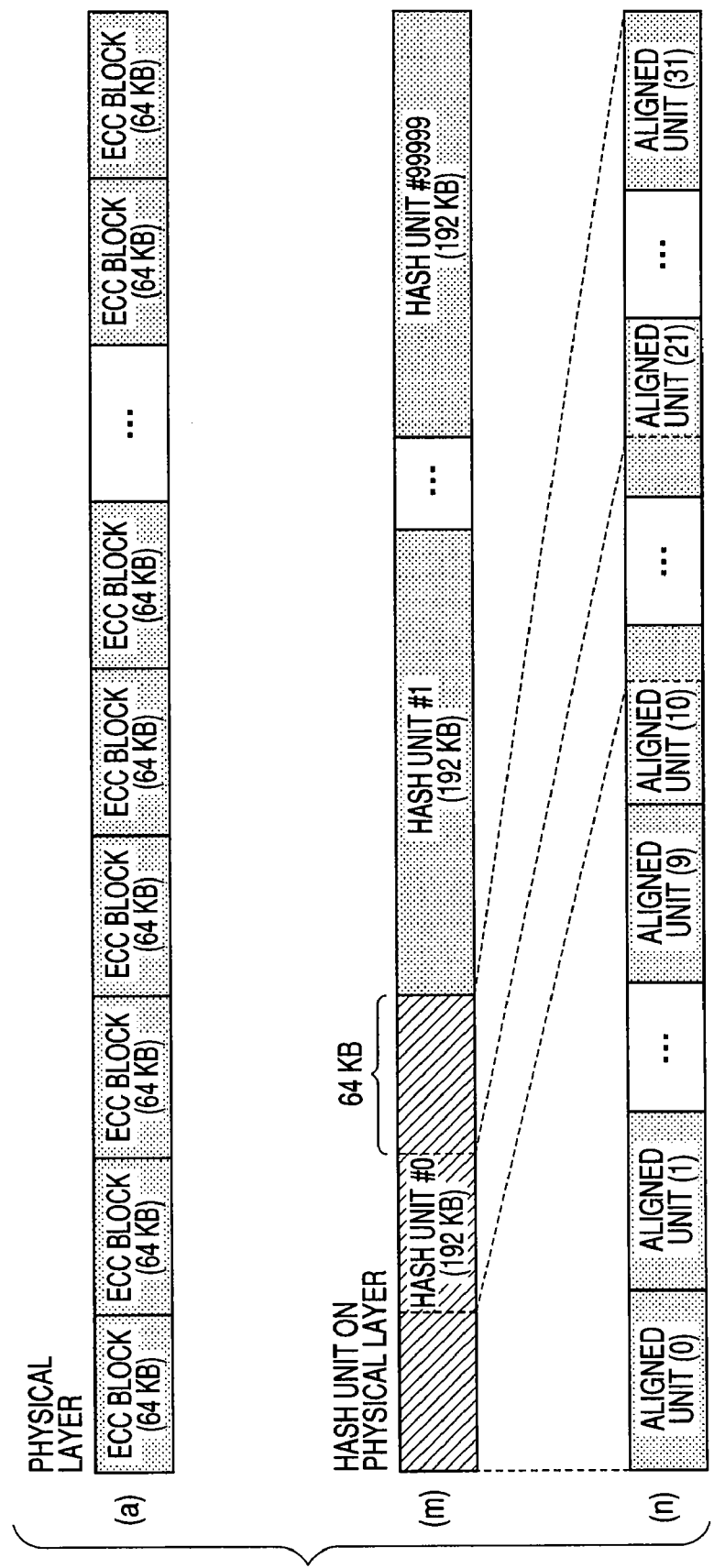
FIG. 8 is a diagram illustrating the configuration of data recording of an information recording medium, which illustrates correspondence of hash units and aligned units.

Next, correspondence of the arrangement of the ECC blocks recorded in the information recording medium and the hash units will be described with reference to FIG. 8. In FIG. 8, (a) shows the arrangement of the ECC blocks in the same physical layer as that in (a) of FIG. 4. In FIG. 8, (m) shows the arrangement of the hash units on the logical layer. As described with reference to FIG. 5, each hash unit corresponds to the configuration data of a clip file. Each hash unit has the data configuration of a predetermined data length (for example, 192 KB).

The hash unit is 192 KB, and the ECC block is 64 KB. Accordingly, one hash unit is set to have a data length corresponding to three ECC blocks. The ECC block is a unit of a data recording and play processing in the drive. The information processing apparatus (play apparatus) that plays the content reads one or more hash units belonging to the content management unit (CPS unit) of an object to be played, calculates the hash value prior to the play of the content, and collates the calculated hash value and the collation hash value stored in the content hash table (CHT).

In this case, the drive executes data reading in units of ECC blocks. The logical sectors on the logical layer can be distributed and recorded in the physical sectors on the physical layer. However, there are many cases where sector data included in one clip file, that is, continuous sector data on the logical layer are continuously recorded on the physical layer.

As described with reference to FIG. 4, the data recording configuration of one embodiment of the invention first performs recording in a state where the header of each clip file is aligned with the header of the ECC block in the physical layer. In addition, each hash unit (192 KB) is set to have a data length of an integer multiple (three times) of the ECC block (64 KB). As a result, there are many cases where reading of the hash unit is realized by reading three ECC blocks. Consequently, in many cases, the information processing apparatus that executes data verification based on the hash value can realize the reading processing in the hash verification by reading the ECC blocks to the minimum, and thus an efficient verification processing can be performed.

Moreover, the hash unit corresponds to connection data of aligned units as a data processing unit (encryption processing unit), as shown in (n) of FIG. 8. The aligned units shown in (n) of FIG. 8 are arranged on the logical layer. However, in the data recording configuration of one embodiment of the invention, there are many cases where the arrangement of the physical layer shows the same arrangement.

Figure 9:
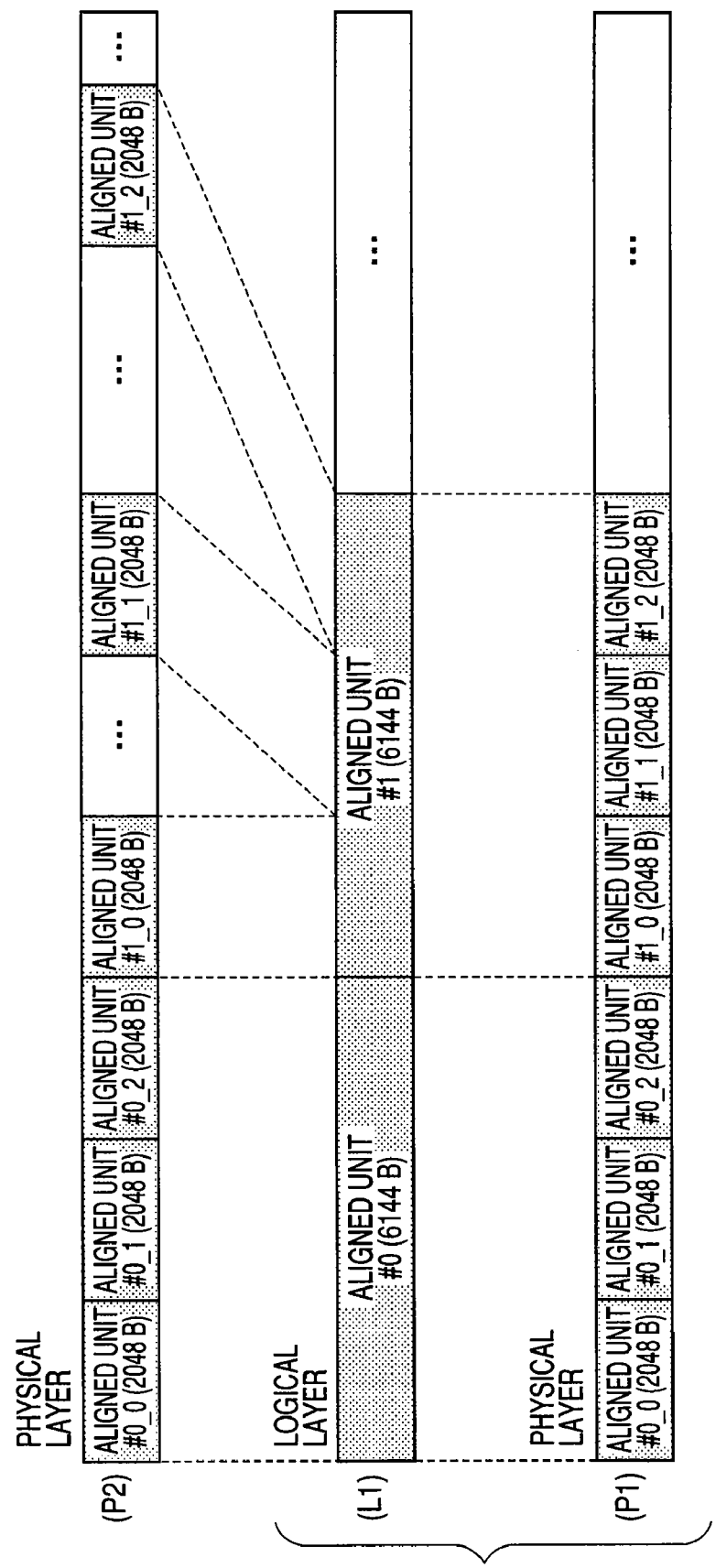
FIG. 9 is a diagram illustrating the configuration of data recording of an information recording medium, which illustrates correspondence of aligned units in a physical layer and a logical layer.

Correspondence of the arrangement on the logical layer of the aligned units as the data processing unit (encryption processing unit) and the arrangement on the physical layer will be described with reference to FIG. 9. In FIG. 9, (L1) shows the arrangement of the aligned units on the logical layer, (P1) shows the arrangement of the aligned units on the physical layer when the configuration of one embodiment of the invention is applied, and (L2) shows the arrangement of the aligned units on the physical layer when a known data recording processing is performed.

In the configuration of one embodiment, that is, in the arrangement of the aligned units on the logical layer shown in (L1) of FIG. 9 and the arrangement of the aligned units on the physical layer shown in (P1) of FIG. 9, at least data of the header portions of the clip files are aligned, as shown in the drawing. This is because the data recording processing described above with reference to FIG. 4, that is, data recording is performed to align the header portion of the clip file with the header of the EEC block on the physical layer. In the past, since such data recording is not performed, as shown in (P2) of FIG. 9, there are many cases where the aligned units as the data processing unit (encryption processing unit) are recorded to be spaced away from each other on the physical layer. According to an existing rule, further segmentalization of the logical sector (2048 B) is inhibited, but the division of the aligned unit (6144 B=2048 B×3) as the encryption unit into the sectors (2048 B) is permitted. As a result, there are many cases where data are aligned discontinuously as shown in (P2) of FIG. 9.

With the data recording configuration ((P1) of FIG. 9) according one embodiment, an access to the recording medium upon hash calculation can be efficiently performed, and the encryption processing of the content stored in the information recording medium can be efficiently performed. That is, as shown in (P2) of FIG. 9, when the aligned units are divided and recorded on the physical layer, a process of executing the encryption processing upon data recording or the decryption processing upon the data play becomes inefficient. As described above, the CBC mode is used for the encryption and decryption of the content. A unit of chain is 6144 B (=the size of Aligned Unit). Accordingly, for the encryption and decryption of the aligned unit #X_1 and the aligned unit #X_2, the last 16 bytes (the minimum unit of AES) of the (logically) adjacent aligned unit are required.

That is, as described above with reference to FIG. 7, the encryption processing includes a process of executing an operation result of any unit and an operation (exclusive OR) between continuous units. Accordingly, if the logical sectors in the aligned unit are divided, when the aligned unit #1_1 is encrypted, the last 16 bytes of the aligned unit #1_0 need to be held during an access to separated data. One content has multiple aligned units and, upon data recording or data play, an access time of the separated data is accumulated. If the access standby time is accumulated, data processing efficiency is degraded. In contrast, in case of the arrangement shown in (P1) of FIG. 9, since the units are continuously arranged, an access upon data recording or play can be continuously made, and a data access time can be reduced, such that an efficient processing can be performed.

Next, an example of the configuration of the content hash table (CHT) that stores the collation hash value corresponding to each hash unit, that is, the hash value previously calculated on the basis of legal content data for each hash unit will be described. FIG. 10 shows an example of the data configuration of one content hash table (CHT) set for one recording layer of the information recording medium.

The following are recorded in the content hash table (CHT).
The total number of clips (NC)
The total number of hash units (NH)
Further, in addition to these data, for each clip(i), the following are recorded in the content hash table (CHT).
Hash unit number of header of clip(i)
Number corresponding to file name of clip(i)
Offset value of clip(i)
For each clip, [Hash Value] as the hash value (collation hash value) for each hash unit is recorded.

[Hash Value] as the hash value (collation hash value) for each hash unit is recorded by a disc factory that executes the recording processing of legal contents.

For example, in case that the content verification by the hash value calculation and the collation processing is executed in the information processing apparatus (play apparatus), the total number of hash units (NH) is used to acquire the number as the selection range when the hash unit number is randomly selected. The specific processing example will be described.

Revision detection accuracy can be increased by selecting the hash units for all the hash numbers. According to a method of randomly selecting the clip number from all the clip numbers and randomly selecting the hash units in the selected clip, without using the number of hash units, for example, when '999 clip files having an extremely small size that are not revised' and 'one clip file having a large size that is revised' are recorded in one disc, there is bare possibility that revision is detected. However, with the configuration that selects the hash units for all the hash numbers, a possibility of revision detection can be increased.

The hash unit number of the header of the clip(i) gives the numbers 0 to NC for the clip files on the disc (for example, 1000 to the maximum). Then, the numbers in all the hash units of the (logical) header of the hash unit belonging to each clip file are described. This is as described above with reference FIG. 5.

The offset value of the clip(i) is an identification value of a layer (recording layer) of the disc. The offset values of the layer 0 all are 0 (zero), and the offset value of the layer 1 is set as a value indicating the number of hash units of each clip included in the layer 0. With this value, a logical address of the hash unit of the table of the layer 1 can be easily recognized.

The information processing apparatus (play apparatus) that plays the contents from the information recording medium can compare the hash value calculated from an arbitrary hash unit of the content on the information recording medium upon the play of the information recording medium and the collation hash value described in the content hash table so as to perform revision verification of the content.

Figure 11:
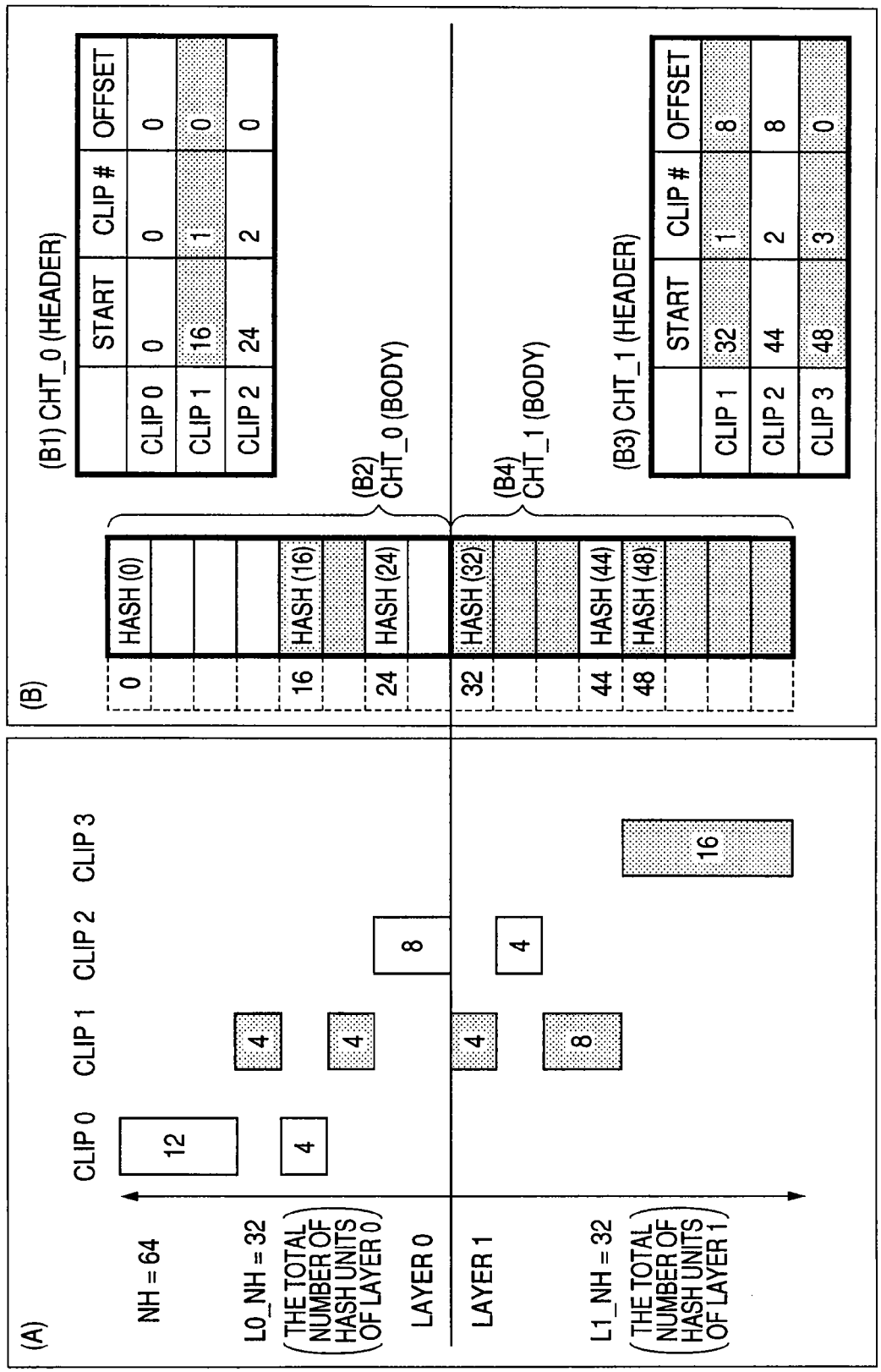
FIG. 11 is a diagram illustrating an example of the specific configuration of a content hash table.

The specific configuration of the content hash table (CHT) will be described with reference to FIG. 11. In FIG. 11, (A) shows the data recording configuration of the information recording medium (disc) having two recording layers (Layers 0 and 1), and (B) shows the configuration of the content hash table corresponding to the recording data.

As shown in (A) of FIG. 11, four clips (Clip 0 to 3) are recorded in the information recording medium (disc) having the two recording layers (Layers 0 and 1), and the total number of hash units (NH) is 64. The clip 0 has 16 hash units, and all the hash units are recorded in the layer 0. The clip 1 has 8 hash units that are recorded in the layer 0, and 12 hash units that are recorded in the layer 1. The clip 2 has 8 hash units that are recorded in the layer 0, and 4 hash units that are recorded in the layer 1. The clip 3 is a clip having 16 hash units that are recorded in the layer 1.

The total number of hash units of the layer 0 (L0_NH)=32, and the total number of hash units of the layer 1 (L1_NH)=32.

In this configuration, the content hash table (CHT) is set in layers, and two content hash tables (CHT) are recorded. In FIG. 11, (B) shows data of the header and body of the content hash table (CHT). (B1) is header data of the content hash table (CHT) of the layer 0. For the clips (Clip 0 to 2) included in the layer 0, the following values are stored.

Hash unit number of header of clip(i)=Start
Number corresponding to file name of clip(i)=Clip#
Offset value of clip(i)=Offset (B2) is body data of the content hash table of the layer 0, and the collation hash value of each hash unit (hash numbers 0 to 31) included in the layer 0 is stored.

(B3) is header data of the content hash table of the layer 1, and, for each clip (clips 1 to 3) included in the layer 1, the following values are stored.

Hash unit number of header of clip(i)=Start
Number corresponding to file name of clip(i)=Clip#
Offset value of clip(i)=Offset (B4) is body data of the content hash table of the layer 1, and the collation hash value of each hash unit (hash numbers 32 to 63) included in the layer 1 is stored.

The information processing apparatus (play apparatus) that plays the contents from the information recording medium compares the hash value calculated from an arbitrary hash unit of the content on the information recording medium upon the play of the information recording medium and the collation hash value described in the content hash table so as to perform revision verification. These processings will be described below.

4. Content Verification Processing based on Recorded Information of Content Hash Table Next, the content verification processing based on the recording information of the content hash table will be described. In an example of the content verification processing described below, content revision verification by hash verification when the content stored in the information recording medium is used is executed, and, at the previous stage or the initial state of the hash verification sequence, a processing of checking on the basis of the recording information of the content hash table that an illegal content not having a registered hash value other than the contents having a registered hash value is not recorded in the information recording medium. If it is detected that the illegal content not having a registered hash value is recorded in the information recording medium, the utilization and play of the illegally recorded content stops.

Figure 12:
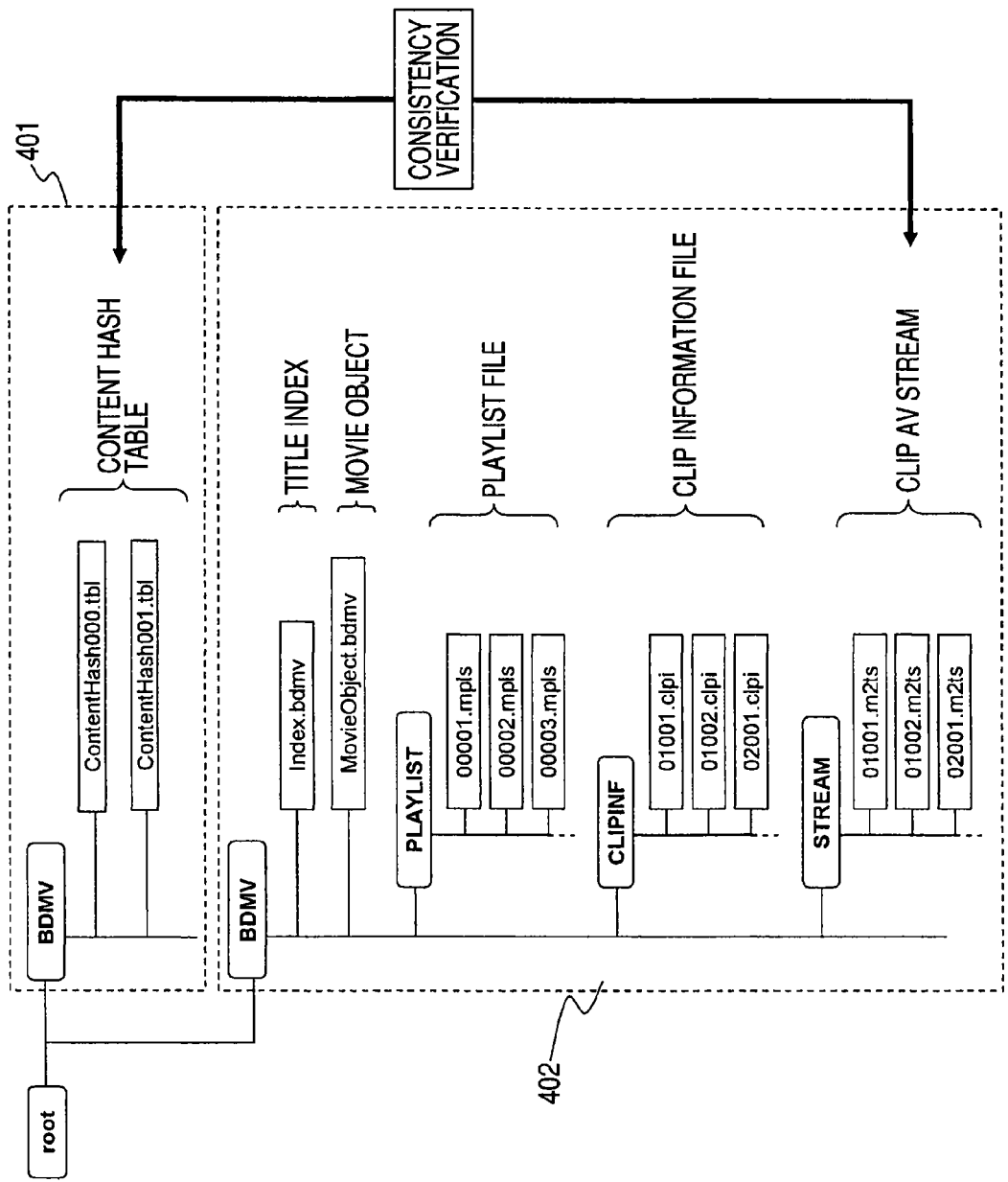
FIG. 12 is a diagram showing an example of the configuration of a directory storing contents and management information, such as key information, to be recorded in an information recording medium.

FIG. 12 shows an example of the directory configuration that stores the contents to be recorded in the information recording medium and management information, such as key information. The directory configuration shown in FIG. 12 shows a BDMV directory that is set as a directory keeping the contents and applications according to the Blu-ray™ disc ROM format. The BDMV directory is divided into a content management data portion 401 and a content data portion 402. As described above with reference to FIG. 2, the content data portion 402 has a hierarchy of the title, the object, the playlist, the clip information, the AV stream and the like, and data files constituting these data are set in the BDMV directory.

In the content management data portion 401, management files corresponding to the contents are stored. For example, the content hash table described with reference to FIGS. 10 and 11 is recorded. In addition, though not shown in FIG. 12, the unit key management table described with reference to FIG. 3 and content utilization control information (CCI), such as limitation information of the play or copy processing of the contents set corresponding to each unit, are stored.

The content hash table (CHT) set in the content management data portion 401 is a table that stores the hash value calculated corresponding to the legal content recorded in the information recording medium. As described above with reference to FIG. 10 or the like, the content hash table is a table in which the clip file as the AV stream actual data constituting the CPS unit is segmentalized, and the hash value calculated on the basis of the hash unit of a predetermined data unit (for example, 192 KB) is stored as the collation hash value in terms of each hash unit.

As described above with reference to FIGS. 10 and 11, the content hash table (CHT) includes header information and body information. In the header information, the following are recorded.

The total number of clips (NC)
The total number of hash units (NH)
In addition, for each clip(i), the following data are recorded.

Hash unit number of header of clip(i)
Number corresponding to file name of clip(i)
Offset value of clip(i)
[Hash Value] as the hash value (collation hash value) in terms of the hash units for each clip is recorded in the body information.

The hash value recorded in the content hash table (CHT) is a hash value for each hash unit set by segmentalizing the clip file as the AV stream actual data constituting the CPS unit in a predetermined data unit (for example, 192 KB). Therefore, if the data size of the content recorded in the information recording medium becomes large, the number of hash units is increased. That is, the number of hash units recorded in the header information of the content hash table (CHT) is set to a number according to the data size of the content recorded in the information recording medium.

When an illegal content is additionally recorded in the information recording medium, the hash value corresponding to the illegal content is not recorded in the content hash table, and thus consistency of the data size of the content recorded in the information recording medium and the number of hash units of the content hash table is collapsed. The information processing apparatus of one embodiment that executes the content play processing checks the consistency of recording data of the content hash table and the data size of the content recorded in the information recording medium, and verifies presence/absence of the illegally added recording content.

In the consistency verification processing, when it is determined that the consistency is absent, the play of the content is inhibited. In the consistency verification processing, when it is determined that the consistency is present, next, the content revision verification is executed using the hash values recorded in the content hash table (CHT). In the revision verification, when the collation of the hash values is not established, it is determined that the content is revised, and the play of the content is inhibited. In the revision verification, when the collation of the hash values is established, it is determined that the content is not revised, and the play of the content is permitted. With the verification sequence, the utilization of the illegal content is excluded.

The content verification processing that is executed in the information processing apparatus playing the content will be described with reference to FIG. 13 and the like. First, a sequence of a content consistency verification processing of checking the consistency of the recording data of the content hash table and the data size of the content recorded in the information recording medium, and verifying presence/absence of the illegally added recording content is described with reference to a flowchart of FIG. 13.

First, at Step S101, the information processing apparatus that is going to play the content stored in the information recording medium first acquires the clip number and the number of hash units of each clip from the content hash table (CHT) recorded in the information recording medium. The information processing apparatus acquires the information from the content hash table (CHT) described above with reference to FIGS. 10 and 11.

Figure 14:
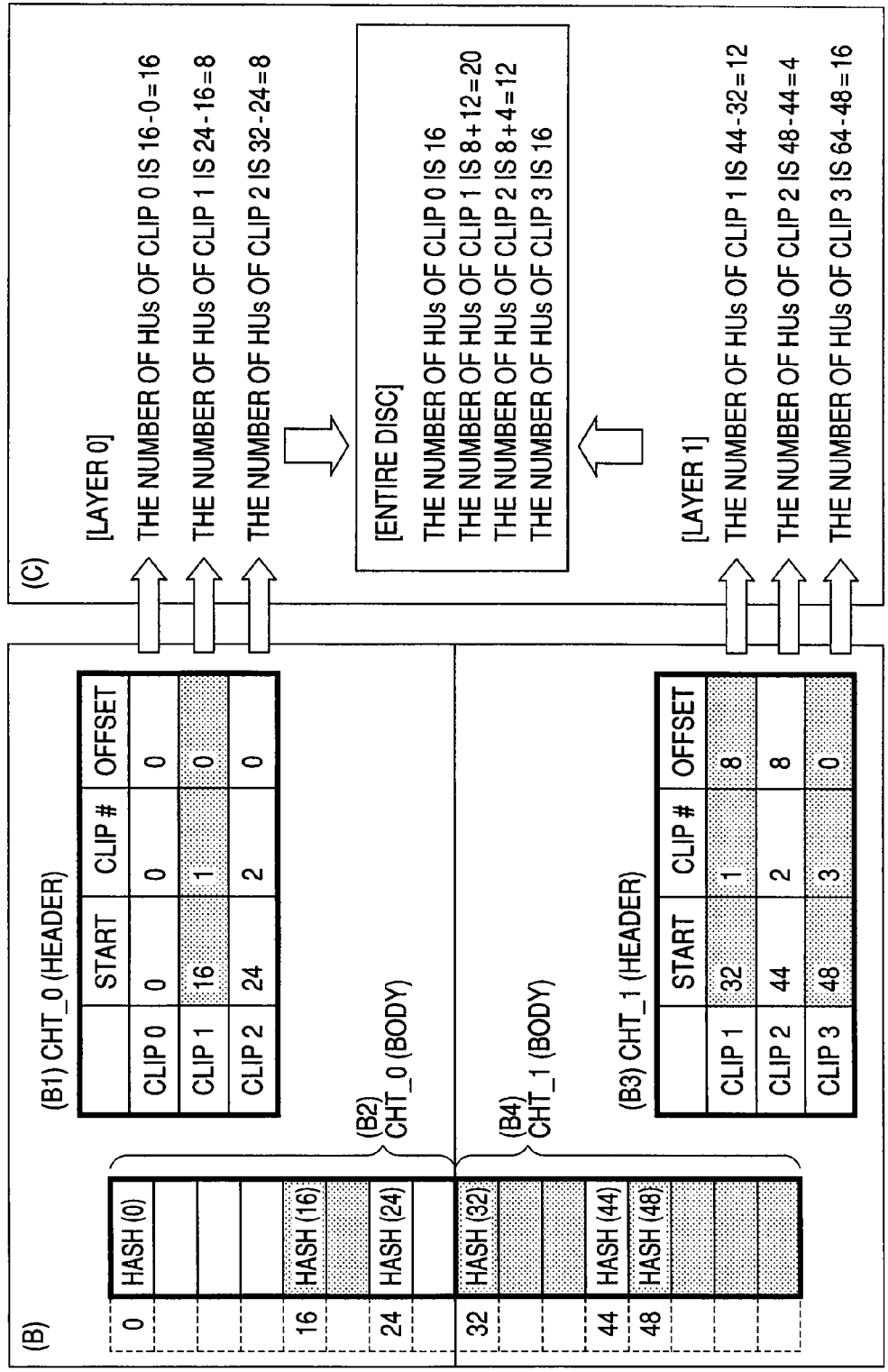
FIG. 14 is a diagram illustrating a method of calculating the number of hash units for each clip.

A calculation method of the number of hash units for each clip based on the recording data of the content hash table (CHT) will be described with reference to FIG. 14. In FIG. 14, (B) corresponds to (B) of FIG. 11 and shows the configuration of the content hash table set for each layer in the information recording medium having two recording layers (Layers 0 and 1). (B1) and (B3) are header data of the content hash tables of the layers 0 and 1. For each clip (Clips 0 to 3) respectively included in the layers 0 and 1, the following values are stored.

Hash unit number of header of clip(i)=Start
Number corresponding to file name of clip(i)=Clip#
Offset value of clip(i)=Offset In FIG. 14, (C) shows a method of calculating the number of hash units corresponding to each clip from the content hash tables. For example, as for the number of hash units (HU) of the clip 0, first, the number of hash units of the clip 0 of the layer 0 is calculated from the content hash table of the layer 0 in the following sequence.

A number obtained by subtracting the hash unit number (0) of the header of the clip 0 from the hash unit number (16) of the header of the clip 1, that is, the number of HUs of the clip 0 in the layer 0=16−0=16

With this equation, the number of HUs 16 of the clip 0 in the layer 0 is calculated. Since data of the clip 0 does not exist in the content hash table of the layer 1, it is determined that the number of hash units of the clip 0 is 16.

As for the number of hash units (HUs) of the clip 1, first, for the layer 0, a number obtained by subtracting the hash unit number (16) of the header of the clip 1 from the hash unit number (24) of the header of the clip 2, that is, the number of HUs of the clip 1 of the layer 0=24−16=8 is calculated from the content hash table of the layer 0.

Next, for the layer 1, a number obtained by subtracting the hash unit number (32) of the header of the clip 1 from the hash unit number (44) of the header of the clip 2, that is, the number of HUs of the clip 1 of the layer 1=44−32=12 is calculated from the content hash table of the layer 1.

The number of hash units (HUs) of the clip 1 is obtained by the sum of the layers 0 and 1. That is, with the following equation, the number of HUs of the clip 1=8+12=20
the number of hash units 20 of the clip 1 is calculated.

Here, for other clips, the same hash unit calculation processing is executed. In the example shown in FIG. 14, the number of hash units (HUs) of the clip 0=16
the number of hash units (HUs) of the clip 1=20
the number of hash units (HUs) of the clip 2=12
the number of hash units (HUs) of the clip 3=16

The number of the hash units corresponding to each clip is calculated from the content hash table (CHT).

Next, at Step S102, the file name and the file size of the content (AV stream file) recorded in the information recording medium are acquired from the file system information recorded in the information recording medium. Moreover, the file system information is information on the data file recorded in the information recording medium, for example, file information, such as the file name, and the file size of the file constituting the AV stream data as the content.

As the specific file system, for example, UDF (Universal Disc Format) or BDFS (Blu-ray disc file system) to be used as a file format of Blu-ray™ disc is used. For example, in the BDFS file system, information, such as the file name, and the file size of an AV stream clip file set at the end of the directory shown in FIG. 12 are acquired from the file system information. In the UDF, similarly, the file name, the file size, and the like of a clip file corresponding to the AV stream are acquired from the file system information.

Next, at Step S103, for each file, the consistency of the file size and the number of hash units recorded in the content hash table (CHT) is verified. As described above, the hash value recorded in the content hash table (CHT) is a hash value that is set for each hash unit set by segmentalizing the clip file as the AV stream actual data in a predetermined data unit (for example, 192 KB). Accordingly, if the data size of the content recorded in the information recording medium becomes large, the number of hash units is increased. That is, the number of hash units recorded in the header information of the content hash table (CHT) is set to a number according to the data size of the content recorded in the information recording medium.

The data size of the clip file for all the AV stream clip files obtained from the file system information and the number of hash units corresponding to each clip recorded in the content hash table (CHT) are compared. Then, it is possible to determine whether or not the number of hash units according to the file size is set. Specifically, for the number of hash units (n) corresponding to each clip(i) recorded in the content hash table (CHT), it is determined whether or not the following expression is established.

192 KB×n≈the data size of the clip file

When the clip data file not satisfying the expression is detected, it is determined that the data file is an illegal content whose hash value is not registered in the content hash table. In this case, the determination at Step S104 becomes No, and Step S105 progresses so as to perform a play inhibition processing. When the expression is established for all the clip data files obtained from the file system information, it is determined that all the contents recorded in the information recording medium are legal contents whose hash value is registered in the content hash table (CHT) and, at the next step, that is, at Step S106, the content revision verification processing is performed. The content revision verification processing at Step S106 is a revision verification processing of the content using the hash value registered in the content hash table (CHT).

Figure 15:
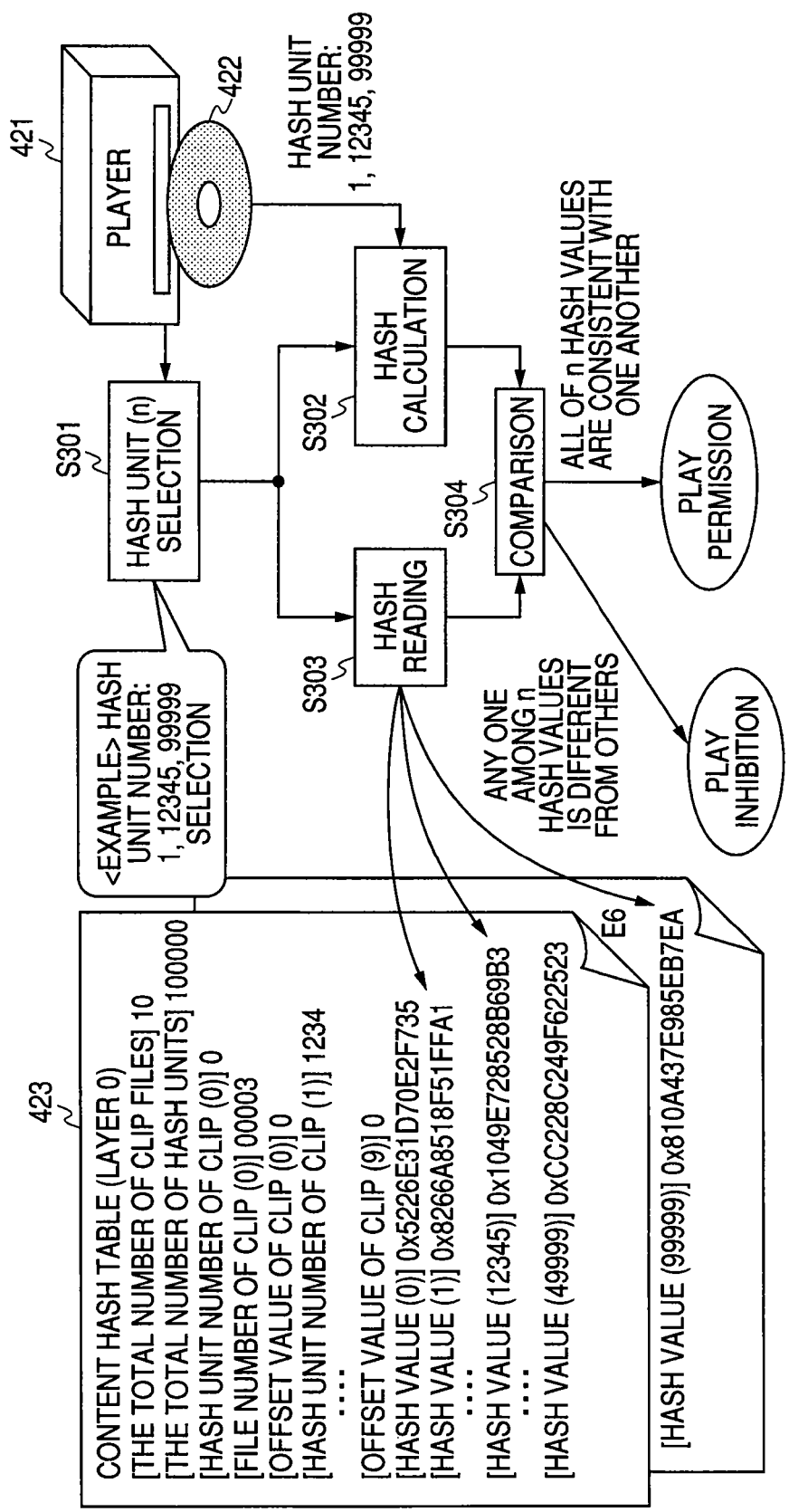
FIG. 15 is a diagram illustrating a sequence of a content verification processing based on hash values in an information processing apparatus that plays contents.

The content revision verification processing that is executed by the information processing apparatus (play apparatus) playing the contents from the information recording medium will be described with reference to FIGS. 15 to 17.

In the content consistency verification processing described with reference to FIG. 13, if it is checked that the illegally added content is not recorded in the information recording medium, the information processing apparatus that plays the contents from the information recording medium verifies validity of the content by the content revision verification using the hash value registered in the content hash table (CHT).

The information processing apparatus that plays the contents has a content verification unit that verifies the validity of the content, and a content play unit that executes the content play processing on a condition that the validity of the content is checked on the basis of the verification of the content verification unit. The content verification unit selects n (where n is an integer of 1 or more) hash units set as segmentalized data of the content recorded in the information recording medium, executes a collation processing of calculated hash values based on the selected hash units and the collation hash value stored in the information recording medium, and executes the content verification processing on a condition that the validity of the content is checked when the collation of the selected n hash values is established FIG. 15 shows the outline of a processing to be executed by the content verification unit in the information processing apparatus (play apparatus). When the information recording medium 422 having recorded thereon the content is mounted, prior to playing the content, the information processing apparatus (play apparatus) 421 selects the hash units corresponding to the content to be played and executes the collation of the hash values set for the hash units.

First, at Step S301, the hash units that are subject to the collation processing are selected. As will be apparent from the above description, the stored content of the information recording medium is divided into the hash units having a predetermined data length (for example, 192 KB). The information processing apparatus 421 selects the units subject to the collation processing from multiple hash units. The details of the selection processing will be described below with reference to FIG. 17. As the hash units to be selected as one subject to the collation processing, a plurality (n) of hash units, for example, three hash units are randomly selected.

The selected hash units are as follows.
Hash unit#1
Hash unit#12345
Hash unit#99999

At Step S302, hash unit correspondence data corresponding to the selected hash units are read from the information recording medium 422, and the hash value of each selected hash unit is calculated. The calculated hash values are as follows.
Hash value of hash unit#1=aaa
Hash value of hash unit#12345=bbb
Hash value of hash unit#99999=ccc Meanwhile, at Step S303, the collation hash values of the content hash units subject to the collation processing selected at Step S301 are read from the content hash table 423 stored in the information recording medium 422. The read collation hash values are as follows.
Hash value of hash unit#1=AAA
Hash value of hash unit#12345=BBB
Hash value of hash unit#99999=CCC At Step S304, a comparison processing of the hash values calculated on the basis of the hash units of the content at Step S302 and the collation hash values read from the content hash table (CHT) is executed. When all the calculated hash values and the collation hash values of the hash units are consistent with each other, that is, when the following are established, it is determined that the revision of the content is absent, the play of the content is permitted, and the content play processing progresses.
aaa=AAA
bbb=BBB
ccc=CCC Meanwhile, when it is detected that any of the calculated hash values and the collation hash values of the hash units is inconsistent with each other, that is, when any one of the following is detected, it is determined that the revision of the content is present, the play of the content is inhibited, and then the progress of the subsequent content play processing stops.
aaa≠AAA
bbb≠BBB
ccc≠CCC Next, a sequence of the content revision verification processing on the basis of the content hash in the information processing apparatus playing the contents will be described in detail with reference to FIGS. 16 and 17.

Figure 16:
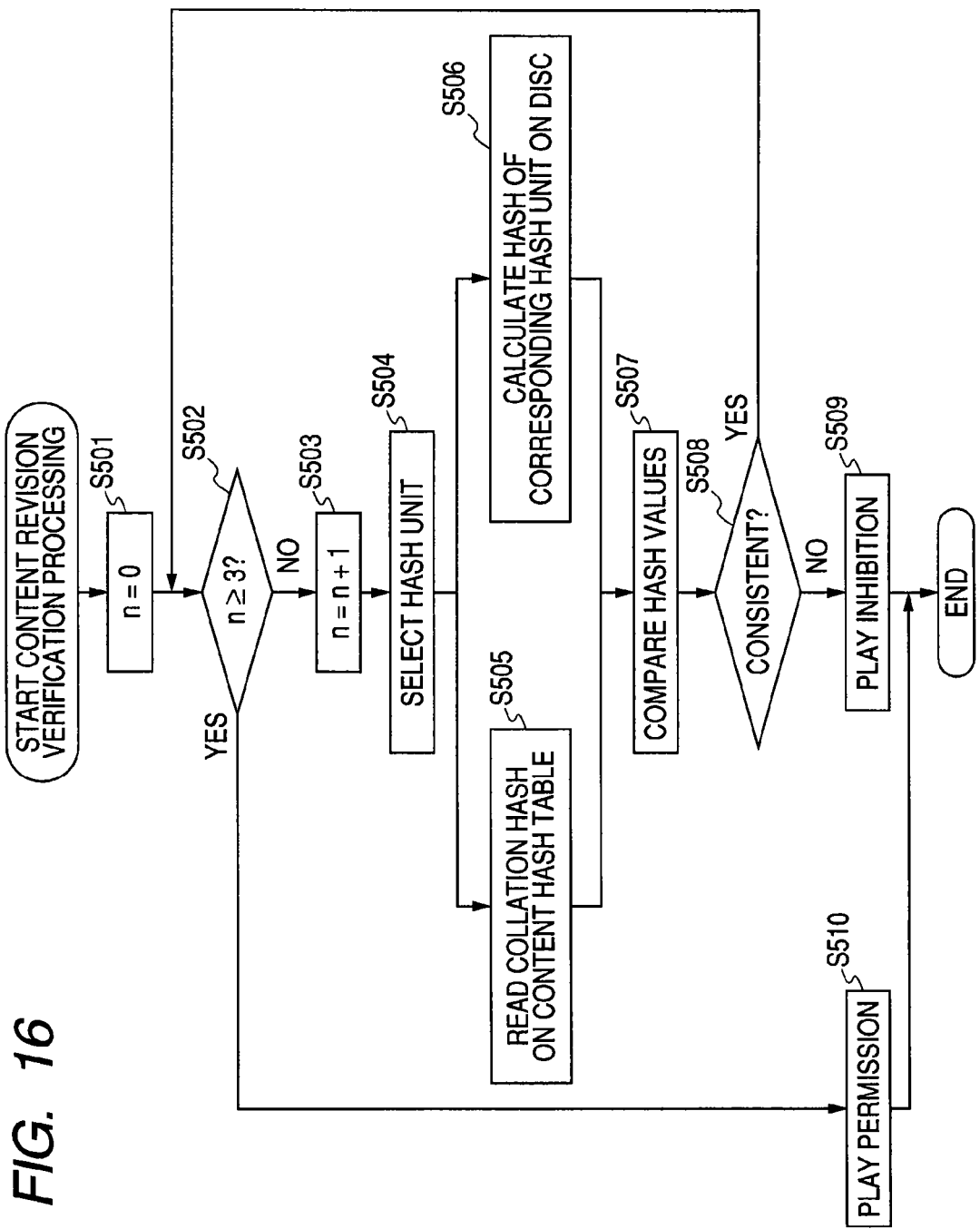
FIG. 16 is a flowchart illustrating a sequence of a content verification processing based on hash values in an information processing apparatus that plays contents.
Figure 17:
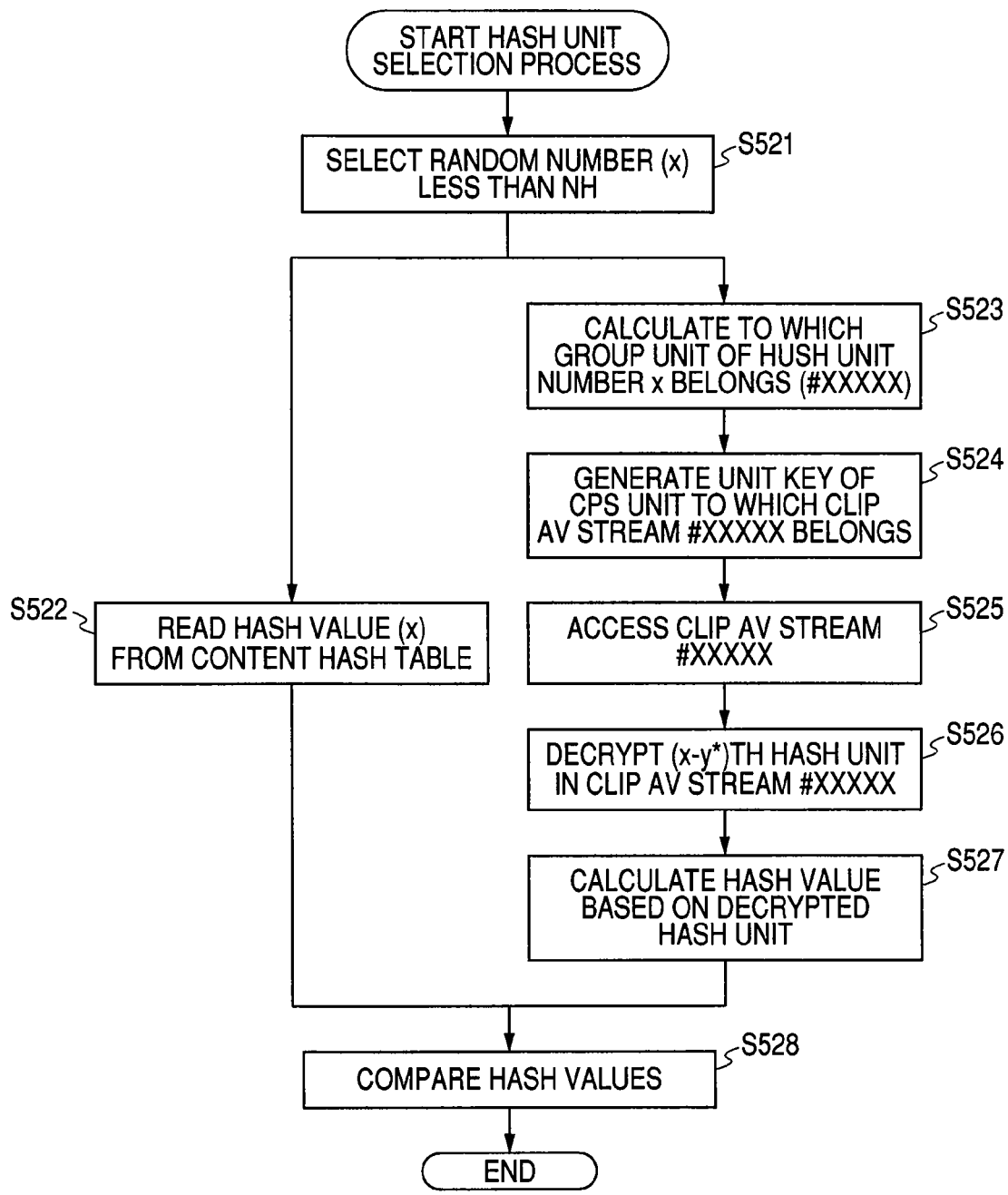
FIG. 17 is a diagram illustrating a sequence of a content verification processing with the application of hash values based on plaintext data in an information processing apparatus that plays contents.

A processing flow of FIG. 16 is an example of a processing of setting the number of hash units n subject to the collation processing based on the hash values n=3.

As Step S510, the information processing apparatus that executes the collation of the hash values sets an initial value n of the number of hash units subject to the collation processing n=0 as an initial setting. At Step S502, it is determined whether or not the condition n≧3 is satisfied. When the condition n≧3 is not satisfied, since it does not reach the regular number of collation times (n=3), the collation processing at Step S503 and later is executed.

After the setting n=n+1 is made at Step S503, at Step S504, the hash units are selected on the basis of the hash unit numbers. The selection of the hash units is randomly executed.

Specifically, 'the total number of hash units (NH)' recorded in the content hash table (CHT) is read, and a random number (x) of x<NH is selected. The selected value (x) is set to the hash unit number #x subject to the collation processing.

At Step S505, the collation hash value of the hash unit number #x is acquired from the content hash table stored in the information recording medium. In addition, at Step S506, the hash unit of the hash unit number #x is extracted from the hash units of the content stored in the information recording medium, and the hash value is calculated on the basis of the extracted hash unit. Then, at Step S507, the comparison processing of the calculated hash value and the collation hash value is executed.

At Step S508, it is determined whether or not the calculated hash value and the collation hash value are consistent with each other. If both are consistent with each other, the process returns to Step S502. At Step S502, it is determined whether or not the condition n≧3 is satisfied. When it does not reach the regular number of collation times (n=3), at Step S503, the value n is updated. At Step S504, a new hash unit is selected. At Steps S505 to S507, for a different hash unit, the collation processing of the calculated hash value and the collation hash value is similarly executed. This processing is repeated by the regular number of times and, when the consistency of all the hash values of the regular number (n=3) is checked, at Step S502, the determination on whether the condition n≧3 is satisfied becomes Yes. Then, at Step S510, the play permission is made, and the play processing progresses.

During the hash value verification processing of the regular number of times n, upon the determination at Step S508 on whether or not the calculated hash value and the collation hash value are consistent with each other, when the consistency is not checked, the process progresses to Step S509. At Step S509, the play inhibition is made, and then the play processing of the content does not progress.

When the hash value subject to the collation is set for the encrypted content, like the above-described processing, the hash value can be directly calculated from the hash unit corresponding to the encrypted content read from the information recording medium. However, when the hash value is calculated for the plaintext described above and is stored in the content hash table (CHT) as the collation hash value, the calculated hash value also needs to be calculated on the basis of the plaintext.

A sequence of a processing of performing the verification by the hash value based on the plaintext will be described with reference to FIG. 17. A processing shown in FIG. 17 corresponds to the processing of Steps S504 to S507 of the processing flow shown in FIG. 16. After the processing of Steps S501 to S503 is performed, at Step S521 of FIG. 17, 'the total number of hash units (NH)' recorded in the content hash table (CHT) is read, and the random number of x<NH is selected.

At Step S522, the collation hash value (Hash Value (x)) of the hash unit number #x is acquired from the content hash table (CHT) stored in the information recording medium. At Step S523, it is computed to which group the unit of the hash unit number #x belongs.

As described above, the following are recorded in the content hash table (CHT).

The total number of clips (NC)
The total number of hash units (NH)
In addition to these data, for each clip(i), the following are recorded in the content hash table (CHT).
Hash unit number of header of clip(i)
Number corresponding to file name of clip(i)
Offset value of clip(i)
For each clip, [Hash Value] as the hash value (collation hash value) for each hash unit is recorded.

An assigned clip is calculated from the hash unit number on the basis of the recording data of the content hash table. Next, at Step S524, the unit key of the content management unit (CPS unit) belonging to the clip AV stream is generated. As described above with reference to FIGS. 2 and 3, each clip belongs to any content management unit (CPS unit), and, in each content management unit (CPS unit), the unit key is associated and the encryption by the unit key is made. At Step S524, the unit key is generated. Moreover, a process of generating the unit key is described below.

Next, at Step S525, an access to the clip AV stream is made. At Step S526, the hash unit number #x included in the clip AV stream is acquired, and the decryption processing is executed. In addition, at Step S527, the hash value is calculated on the basis of the decrypted data of the hash unit #x.

At Step S528, the determination as to whether or not the calculated hash value and the collation hash value are consistent with each other is performed. When both are consistent with each other, the same processing is executed for other hash units, and the collation processing is repeatedly executed until the regular number of collation times (for example, n=3) is attained. When the consistency of all the hash values of the regular number (n) is checked, the play permission is made, and the play processing progresses. During the hash value verification processing of the regular number of times n, when a case where the consistency is not checked appears, the play inhibition is made at that time, and the play processing of the content does not progress.

Figure 13:
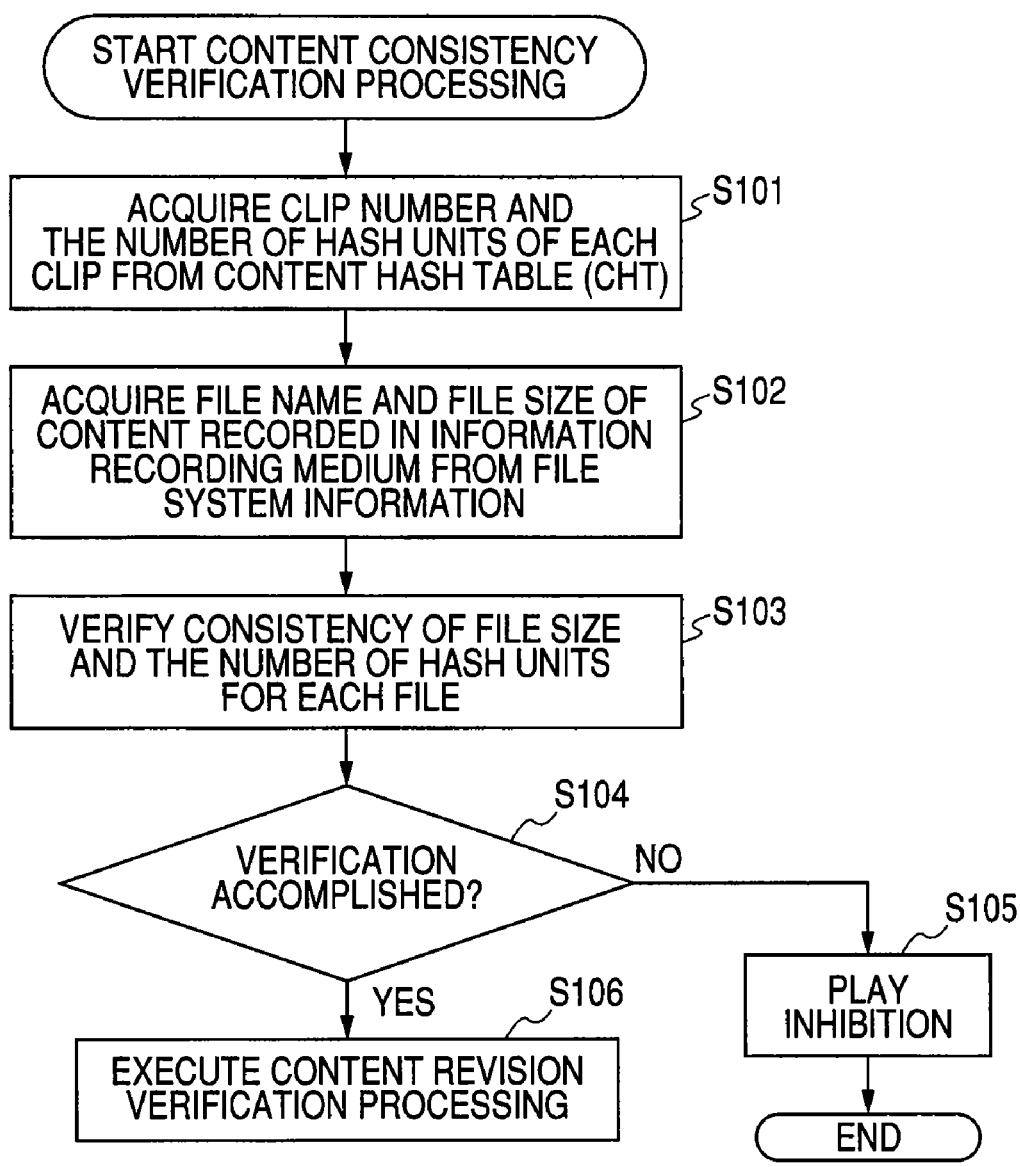
FIG. 13 is a flowchart illustrating a sequence of a content verification processing in an information processing apparatus that plays contents.

Moreover, as described above with reference to the flowchart shown in FIG. 13, in the above-described embodiment, the content consistency verification processing is performed using the file size of the file system, and the content revision verification processing is performed by comparing the hash values of a predetermined number of hash units and the hash values of the hash units registered in the content hash table. However, the processing configuration described below may be adopted.

That is, without executing Steps S101, S102, S103, S104, and S105 of the flowchart shown in FIG. 13, a processing of setting the hash units is executed on the basis of all clips existing on the file system and the sizes without reference to the content hash table. Moreover, the hash unit setting processing to be executed herein is executed by setting, for example, the hash units of the clip size (Kbyte)÷192 Kbyte for one clip so as to have the same configuration as the hash unit registered in the content hash table.

For the hash unit set in such a manner, the hash value is calculated, and the calculated hash value and the hash value of the hash unit registered on the content hash table (CHT) are compared. In the comparison processing, if the calculated hash value and the registered hash value are inconsistent with each other, it can be determined that the revision is performed. That is, for example, in the recording medium having added thereto the content, the hash unit is also set for the added content in the content hash unit setting processing. Accordingly, it has a configuration different from the hash unit registered in the content hash table. As a result, in the hash value comparison processing, the consistency of the hash values is not obtained. With the hash value collation processing, the detection of the revision can be made.

In this modification, since it ensures that the content is not revised, a risk of revision of the content can be further reduced. Meanwhile, in the above-described embodiment, the comparison of the hash values of all the hash unit is not required, a processing ensuring whether or not the addition of the content is made by the comparison of some hash values and the total file size. Accordingly, the revision can be efficiently checked.

5. Content Verification Processing based on Verification of File System Information Next, the content verification processing based on the verification of the file system information will be described. As an example of the content verification processing described below, in '4. Content Verification Processing based on Recorded Information of Content Hash Table', the content consistency verification processing described with reference to FIGS. 13 and 14, that is, a processing of checking whether or not an illegal content not having a registered hash value other than the content having the registered hash value is recorded in the information recording medium is performed by the verification of the file system information stored in the information recording medium.

As described in the above-described example, in the information recording medium, information on the data file recorded in the information recording medium, for example, the file system information having stored therein file information, such as the file name, and the file size of the file constituting the AV stream data as the content is recorded. If it is checked that the file system information is not changed by a disc manufacturer, who manufactures the disc having stored therein the legal content, from the start of disc manufacturing, it can be determined that an illegally added content is absent on the information recording medium.

In an example of the content verification processing described below, a processing of recording a revision verification value of the file system information in the information recording medium in advance, verifying presence/absence of revision of the file system information, and checking whether or not an illegally added recording content exists on the information recording medium is executed.

Figure 18:
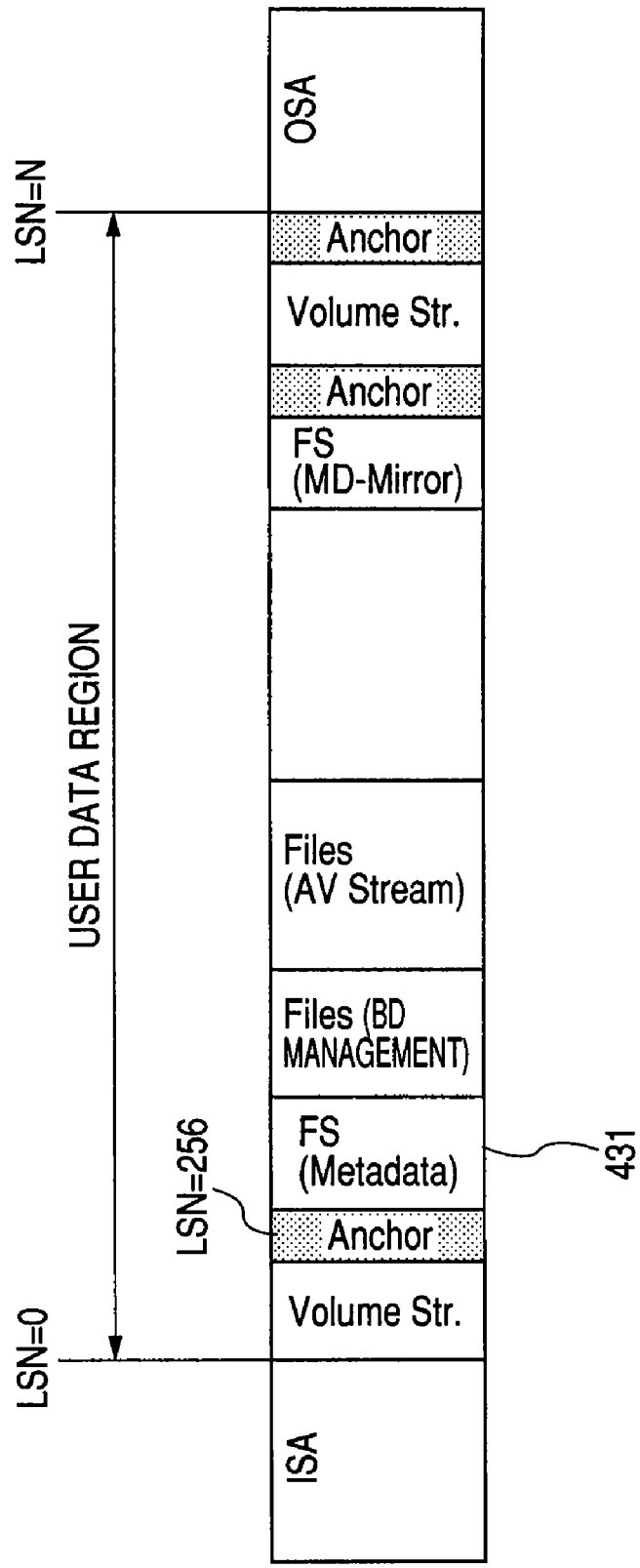
FIG. 18 is a diagram showing the configuration of data recording in an information processing apparatus when a UDF (Universal Disc Format) file system is applied.

FIG. 18 shows the data recording configuration in the information recording medium when a UDF (Universal Disc Format) file system is applied. In the configuration shown in FIG. 18, a user data region corresponds to an information recording medium recording region of a logical sector No. (LSN)=0 to N. The following data are recorded in the user data region.

Volume structure
Anchor
File system (FS (Metadata))
File (BD management information)
File (AV stream data)

The drive first reads an anchor mounted thereon. In the anchor, initial information required for reading data of the information recording medium, for example, directory analysis information, such as pointer information, is stored, and the drive reads anchor information so as to recognize the basic configuration of the stored data of the information recording medium. Moreover, as shown in the drawing, the anchor is recorded at three places, the logical sector No. (LSN)=256, the end of a volume space, and a position spaced by a predetermined gap forward from the end. These have the same anchor information and are recorded as backup data for using when reading is impossible due to a defect occurring in the information recording medium. As shown in the drawing, like the anchor, for the volume structure, the file system (FS (Metadata)), and the like, the same data is plurally recorded as backup data.

After reading the anchor information, the drive reads the volume structure, checks positions of a management file and a data file recorded in the information recording medium, and then reads the file system (FS (Metadata)). Then, the drive executes a processing of reading the file (AV stream data) according to a play sequence.

The file access sequence will be described with reference to FIGS. 19 and 20. FIG. 19 shows a structural example of Volume Structure of the UDF. FIG. 20 shows the content of File Structure and Files. Here, a case where an access to [root/BDMV/Unit_Key_Gen_Value.inf] is made will be described.

In FIG. 19, Volume Structure records information on a logical volume or information on an analysis start point of File Structure recorded in a partition. Moreover, in FIG. 19, the leftmost column represents LSN (Logical Sector Number), the second column from the left represents Structure, the second column from the right represents Descriptor, and the rightmost column represents LBN (Logical Block Number). Further, in FIG. 20, the leftmost column represents LBN (Logical Block Number), the central column represents Structure, and the rightmost column represents Descriptors. Further, in FIG. 20, FID and FE have the following meanings, respectively.

FID: File Identifier Descriptor (describe the file name and the position of FE)

FE: File Entry (record allocation of a file main body and recording date and time information.

Address information in the volume is represented by the LSN (Logical Sector Number), and an address in the partition is represented by the LBN (Logical Block Number). Further, when a plurality of partitions exist in the volume, information on a plurality of partitions can be recorded in Logical Volume Descriptor.

Moreover, in FIGS. 19 and 20, only the items required for processing are described, and the descriptions of the items not required for the processing will be omitted. First, the LSN represented by the number 1 of FIG. 19 analyzes the anchor information (Anchor Volume Descriptor Pointer) of Anchor-1 at a point 256, and acquires a position of Volume Descriptor Sequence represented by the number 2. Subsequently, the LSN represented by the number 2 analyzes Volume Descriptor Sequence at points 32 to 47. In Volume Descriptor Sequence, 'Primary Volume Descriptor', 'Implementation Use Volume Descriptor', 'Partition Descriptor', 'Logical Volume Descriptor', 'Unallocated Space Descriptor', 'Terminating Descriptor', and 'Trailing Logical Sectors' are included. 'Primary Volume Descriptor' stores information for identifying a volume, 'Implementation Use Volume Descriptor' stores information indicating compatibility, 'Partition Descriptor' stores information for identifying a volume, 'Logical Volume Descriptor' stores information indicating a position of a logical partition, 'Unallocated Space Descriptor' stores information indicating an unused region, 'Terminating Descriptor' stores information indicating the last position of the region, and 'Trailing Logical Sectors' stores information of remaining regions.

Among these, the LSN represented by the number 3 of FIG. 19 acquires a position of 'Logical Volume Integrity Sequence' described in 'Logical Volume Descriptor' and a position of a target partition, and a position of File Set Descriptor in the partition.

In addition, the LSN represented by the number 4 analyzes 'Logical Volume Integrity Sequence' at a point 48, and checks the consistency of Volume information. Then, if the consistency is not problematic, the inside of the partition of File Structure and Files of the LSN 272 to 272Na11-272 represented by the number 5 is analyzed. In such a sequence, it is possible to start an access to a target partition.

Subsequently, the LBN represented by the number 11 of FIG. 20 analyzes root information stored in File Set Descriptor of (A+1), and the LBN represented by the number 12 acquires a position of File Entry (in the drawing, shown as FE (Root Directory)) of a root directory of (A+3).

In addition, the LBN represented by the number 12 analyzes File Entry (in the drawing, shown as FE (Root Directory)) of the root directory of (A+3) and acquires a position (LBN=A+4) where the information of the root directory is described. Next, the LBN analyzes FID (File Identifier Descriptor) of the BDMV directory represented by the number 13 of the information of the root directory, and acquires a position (LBN=A+5) of FE (File Entry) (in the drawing, shown as FE (BDMV)) of the BDMV directory represented by the number 14.

In addition, File Entry of the BDMV directory represented by the number 14 is analyzed and a position (LBN=A+9) where the information of the BDMV directory is recorded is acquired.

Subsequently, the information of the BDMV directory is acquired, and File Identifier Descriptor of Unit_Key_Gen_Value.inf in the BDMV directory represented by the number 15 is analyzed, thereby acquiring a position of File Entry of Unit_Key_Gen_Value.inf. Then, File Entry of Unit_Key_Gen_Value.inf of the number 16 is analyzed, a position where data of Unit_Key_Gen_Value.inf is recorded is acquired, and then an access to an address at which the data of Unit_Key_Gen_Value.inf is recorded is made, thereby acquiring target data. In such a sequence, data of a file 'root/BDMV/Unit_Key_Gen_Value.inf represented by the number 17' can be acquired.

When a metadata partition introduced in UDF 2.50 is used, File Set Descriptor represented by the number 11, File Entry of a root directory represented by the number 12, FID (File Identifier Descriptor) of the BDMV directory represented by the number 13, FE (File Entry) of the BDMV directory represented by the number 14, File Identifier Descriptor of Unit_Key_Gen_Value.inf in the BDMV directory represented by the number 15, and File Entry of Unit_Key_Gen_Value.inf represented by the number 16 are arranged in the metadata partition using virtual addresses.

A position where the metadata partition is recorded can be acquired by the file entry of the metadata file. By reading data in the metadata partition in a memory at one time, even when an access to files in a directory having a plurality of hierarchies is made, it is possible to avoid individual reading of three kinds of information, File Identifier Descriptor, File Entry, and directory information each time the directories go down one by one from the recording medium, and it is possible to acquire and analyze information required for reading out the files from information of the metadata partition read in the memory. Moreover, the information shown in FIG. 20 is arranged as one file by clustering of the file structure, and is managed on a virtual address in the file.

Moreover, the substantially entire user data region shown in FIG. 18 is data subject to the content encryption processing according to a normal encryption system. However, some data, such as seed information used as the encryption key generation data, may be not encrypted.

In the UDF (Universal Disc Format) file system shown in FIG. 18, in the file system information 431, file information, such as the file name, and the file size of the file constituting the AV stream data as the content recorded in the information recording medium is stored.

In this embodiment, a revision verification value of the file system information is recorded in the information recording medium in advance, and presence/absence of revision of the file system information is verified on the basis of the revision verification value. Then, it is checked whether or not an illegally added content exists on the information recording medium.

As one storage destination when the revision verification value of the file system information is recorded in the information recording medium, there is known the content certificate. The hash value of the file system information is stored in the content certificate, and the hash value is set to the revision verification value of the file system information.

As described above with reference to FIG. 1, the content certificate (CC) is a certificate for indicating validity of the content stored in the information recording medium. In the certificate, data, such as a content hash digest based on the collation hash unit stored in the above-described content hash table (CHT), is stored, and an electronic signature is attached. For example, an electronic signature, such as an information recording medium manufacturing entity as a disc factory, is added, thereby forming revision-prevention data.

A general content certificate that does not include the hash value of the file system information will be described with reference to FIG. 21. The content certificate has the data configuration shown in FIG. 21.

Header: data indicating that this data is the content certificate

The number of hash digests: the number of hash digests registered in the content certificate (the number of clip files)

The number of hash units: the total number of hash units on the disc

Hash digest: a hash value based on a registered content hash of each hash table

In addition, a content provider ID, a content ID, a disc factory ID, and the like are registered, and a signature of an issuance and management subject (for example, a key management center) of the content certificate is set.

The hash digests registered in the content certificate will be described with reference to FIG. 22, in addition to FIG. 21. In FIG. 22, (*a*) shows the configuration of the content certificate. Header-excluded registered data are header-excluded data portions other than the hash digests and the signature. Hereinafter, a plurality of hash digests (0) to (n) are registered, and the signature is attached.

The hash digests are digest values of the hash units registered in the content hash table shown in (*b*) of FIG. 22. The content hash table is set corresponding to the content recorded in the information recording medium. For example, one content hash table is set and registered corresponding to one CPS unit. In the content hash table, a plurality of content hashes are registered.

The content hashes are hash values generated on the basis of the hash units (for example, 192 KB) selected from the configuration data of the contents shown in (*c*) of FIG. 22. Referring to (*c*) of FIG. 22, one content belongs to one CPS unit, a plurality of data portions from the content are set as the hash units, and the hash values calculated on the basis of the configuration data of the individual hash units are recorded in the content hash table.

In addition, a new hash value is calculated on the basis of all the registered data of the content hash table, and is stored in the content certificate shown in (*a*) of FIG. 22 as the hash digest. That is, the hash digest becomes the hash value to be set for each content (CPS unit) recorded in the information recording medium.

The content hash table shown in (*b*) of FIG. 22 is applied to the content revision verification that is executed prior to the content play processing. For example, the hash unit set as the content to be played is selected, and the hash value is calculated according to a hash value calculation algorithm. Then, according to whether or not the calculated hash value is consistent with the content hash registered in the content hash table, it is determined whether or not the content is revised.

Figure 23:
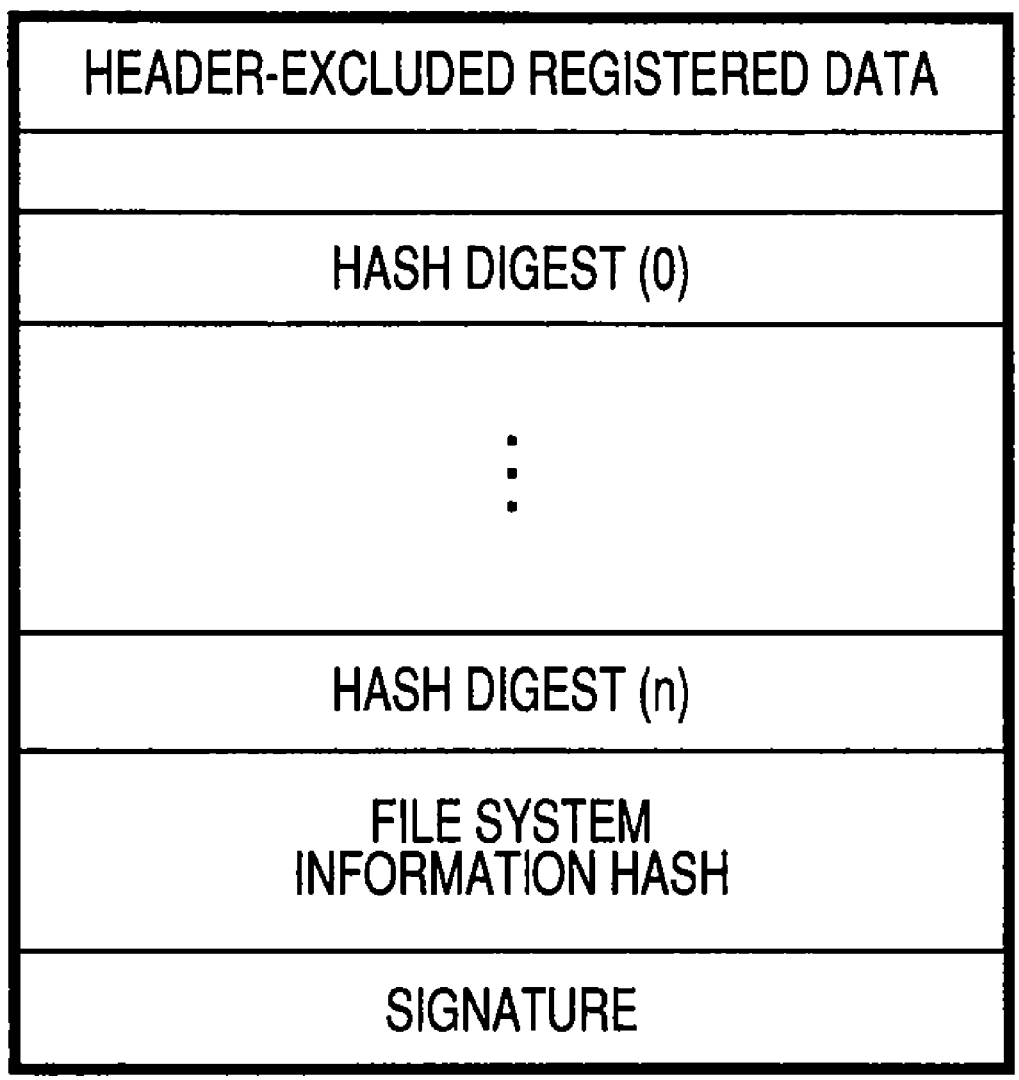
FIG. 23 is a diagram illustrating an example of the data configuration of a content certificate including file system information hash values.

In this embodiment, the content certificate, into which the hash values of the content hash table is integrated, includes the file system information hash value as the revision verification value of the file system information. That is, the content certificate having the configuration shown in FIG. 23 is stored in the information recording medium. In a data example shown in FIG. 23, header-excluded registered data are data other than the hash digests, the file system information hash value, and the signature. The registered data includes the header, the number of hash digests, and the number of hash units, which are described above with reference to FIG. 21, the content provider ID, the content ID, and disc factory ID.

After these data, the hash digest calculated on the basis of the registered data of each content hash table is registered. In addition, the file system information hash value is stored, and the signature of the issuance and management subject (for example, a key management center) of the content certificate is set.

Figure 24:
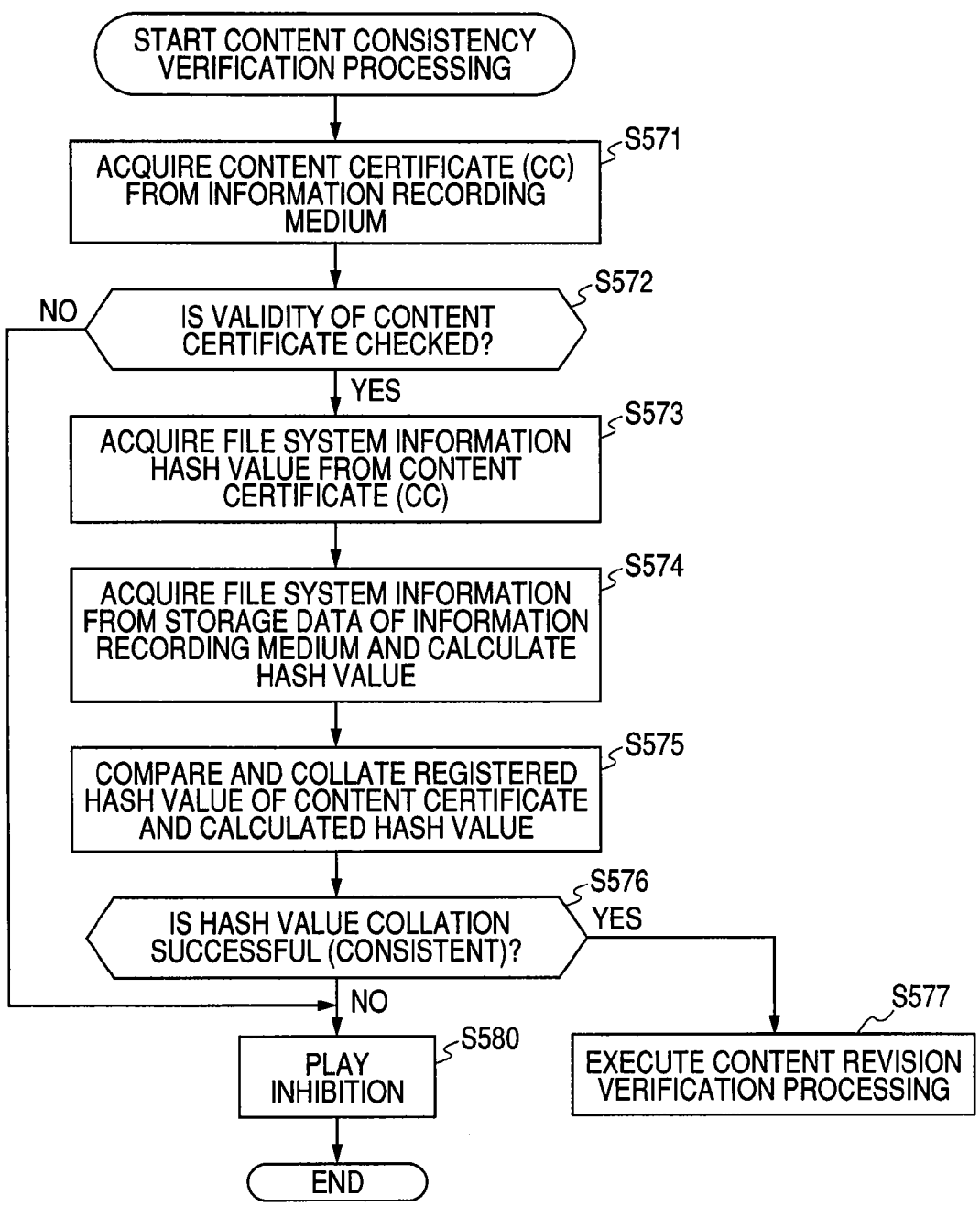
FIG. 24 is a flowchart illustrating a sequence of a content verification processing based on revision verification of file system information in an information processing apparatus that plays contents.

A sequence of the content verification processing of this embodiment will be described with reference to FIG. 24. First, at Step S571, the information processing apparatus that is going to play the contents stored in the information recording medium acquires the content certificate (CC) recorded in the information recording medium. At Step S572, the verification of the content certificate is executed so as to check the validity. That is, the verification of the signature set in the content certificate is executed. For example, a signature verification processing is executed using ECDSA (a signature verification algorithm according to the elliptical curve encryption version). Moreover, the issuance and management subject (for example, a key management center) of the content certificate required for the signature verification is acquired in advance and stored in a memory (NVRAM). If necessary, it may be acquired through a network.

In the verification of the certificate at Step S572, when the validity of the content certificate is not checked, Step S581 progresses, the play inhibition of the content from the information recording medium is made, and the processing stops. As long as it is checked that the content certificate is an unrevised legal certificate, Step S573 progresses. At Step S573, the file system information hash value is acquired from the content certificate.

In addition, at Step S574, the file system information is acquired from the stored data of the information recording medium so as to calculate the hash value. In the hash calculation, a predefined algorithm is used. At Step S575, the file system information hash value acquired from the content certificate at Step S573 and the calculated hash value calculated at Step S574 are compared and collated.

At Step S576, when the hash value collation is successful, that is, when both hash values are consistent with each other, it is determined that the file system information set as the stored data of the information recording medium is unrevised legal file system information, and an illegal content is not additionally recorded in the information recording medium. Subsequently, Step S577 progresses, and the content revision verification processing based on the registered hash value of the content hash table progresses. This processing is the same as the verification processing described with reference to FIGS. 15 to 17 in '4. Content Verification Processing based on Recorded Information of Content Hash Table' described above.

At Step S576, when the hash value collation is failed, that is, when both hash values are inconsistent with each other, it is determined that the file system information set as the stored data of the information recording medium is revised, it is not legal file system information, and there is a possibility that an illegal content is additionally recorded in the information recording medium. In this case, Step S611 progresses, the play inhibition of the contents from the information recording medium is made, and then the processing stops.

As described above, in this example of the processing, presence/absence of the revision of the file system information is verified. Accordingly, it is verified whether or not the file system information recorded at a legally licensed disc manufacturing factory is revised, and thus it can be determined whether or not an illegal content is additionally recorded for a legal disc. Further, when the illegally added content exists, the play utilization of the illegal content can be inhibited through the detection of the illegal content.

6. Processing of Manufacturing Information Recording Medium having Stored therein Verification Value of File System Information Next, a processing of manufacturing the information recording medium having stored therein the verification value of the file system information described above is described.

The information recording medium described in '5. Content Verification Processing based on Verification of File System Information' described above has a configuration in which the file system information corresponding to the recording content of the information recording medium and the hash values based on the file system information are recorded, in addition to the stored contents. The hash values based on the file system information are stored in the content certificate having stored therein the verification data corresponding to the content hash table, in which the hash values generated on the basis of the recording content of the information recording medium are registered.

Figure 25:
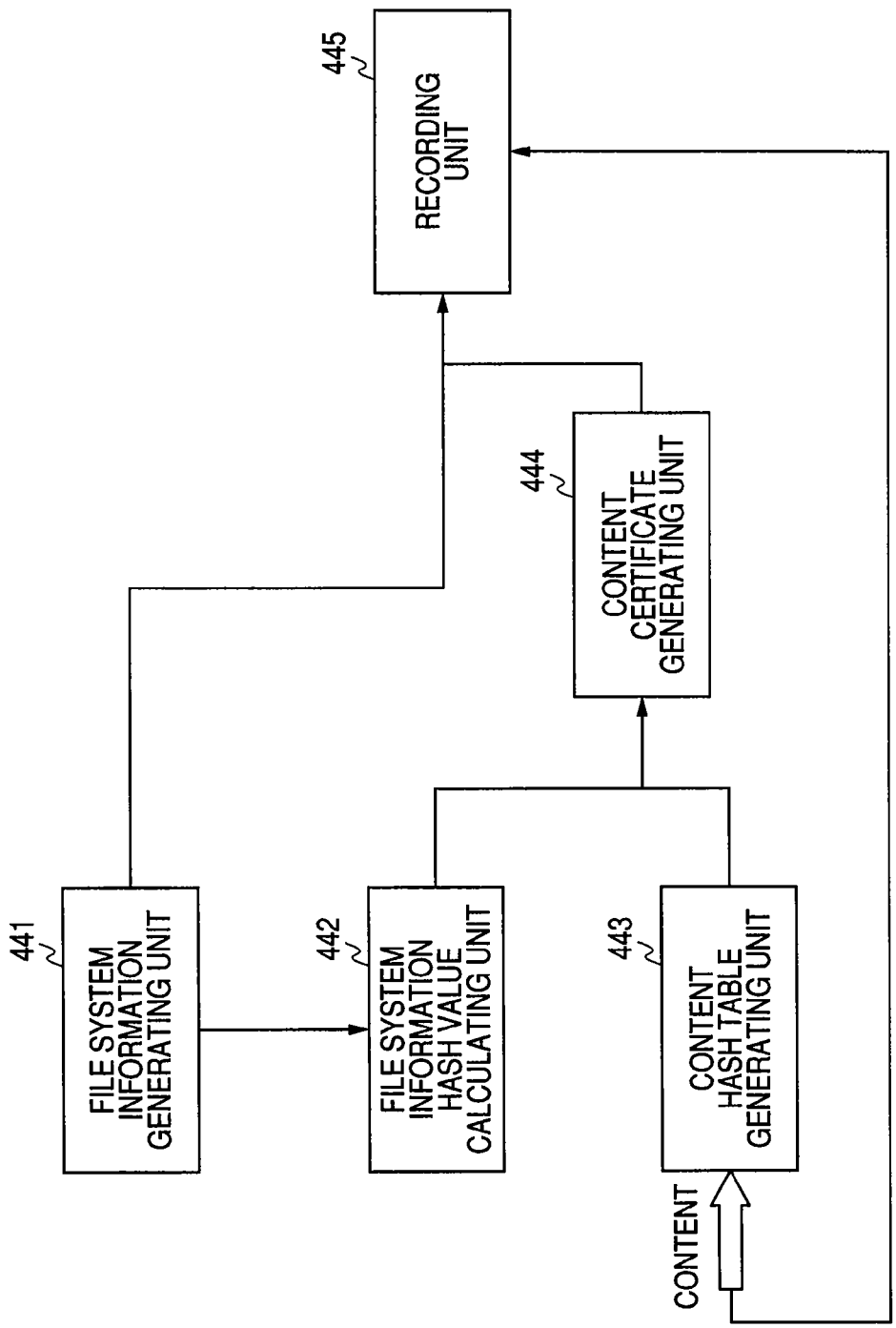
FIG. 25 is a diagram illustrating an example of the configuration of an apparatus for manufacturing an information recording medium.

An apparatus for manufacturing an information recording medium will be described. As shown in FIG. 25, the apparatus for manufacturing an information recording medium has a file system information generating unit 441 that generates the file system information corresponding to the recording content of the information recording medium, a file system information hash value calculating unit 442 that calculates the hash values of the file system information, a content hash table generating unit 443 that generates the content hash table, in which the hash values generated on the basis of the recording content of the information recording medium are registered, a content certificate generating unit 444 that generates the content certificate having the verification data of the content hash table and the hash values of the file system information as registration information, and a recording unit 445 that records the contents, the content hash table, and the content certificate in the information recording medium.

Moreover, the configuration shown in FIG. 25 shows the configuration of the manufacturing apparatus required for recording the file system information and the hash values in the apparatus for manufacturing an information recording medium. In addition, the recording unit needs to record various kinds of management information in the information recording medium, and thus the apparatus for manufacturing an information recording medium has the configuration according to the data processing. Moreover, in an actual disc manufacturing process, a management entity providing various kinds of management information or an entity having the rights of the contents, such as a content owner, exist. The entities provide various kinds of information to a disc manufacturing entity, and then the manufacturing of the information recording medium is performed. The specific manufacturing process will be described below.

Figure 26:
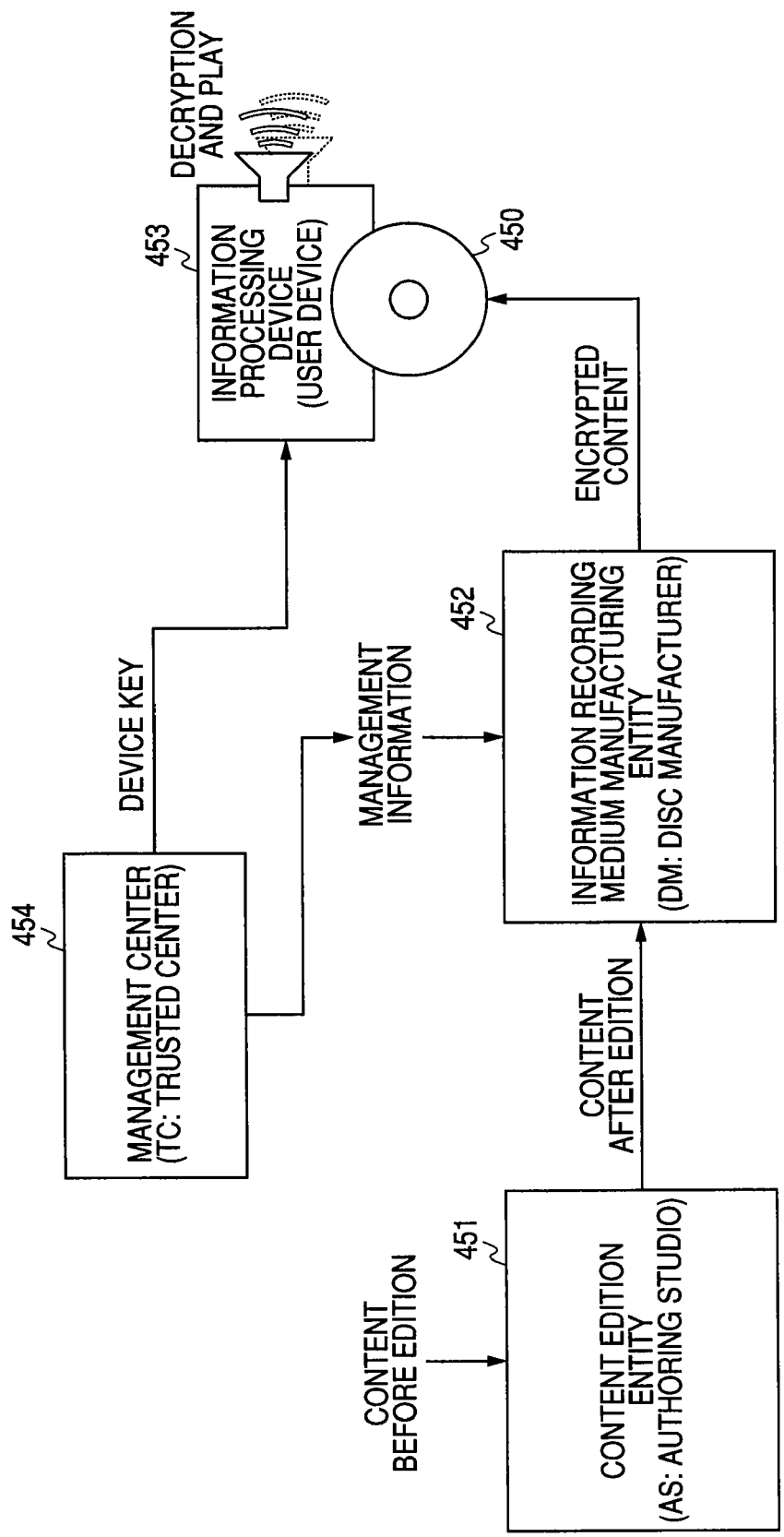
FIG. 26 is a diagram illustrating an example of a processing to be executed by a management center, a content edition entity, and an entity for manufacturing an information recording medium upon manufacturing of information recording medium having stored therein contents.

As shown in FIG. 26, the contents stored in the information recording medium are edited by a content edition entity (AS: Authoring Studio) (=Authoring Facility) 451. Next, an information recording medium manufacturing entity (DM: Disc Manufacturer) (=Encryption Facility) 452 copies (replica) CD, DVD, or Blu-ray™ disc in large quantities. Then, the information recording medium 450 is manufactured and provided to the user. The information recording medium 450 is played by a user's apparatus (information processing apparatus) 453.

A management center (TC: Trusted Center) (=License Entity) 454 executes the management for disc manufacturing, selling, and utilization. The management center (TC: Trusted Center) 454 provides various kinds of management information, for example, a media key Km set corresponding to the media (information recording medium) or the MKB as an encrypted key block having stored therein the media key Km as encrypted data to the information recording medium manufacturing entity (DM: Disc Manufacturer) 452. The information recording medium manufacturing entity (DM: Disc Manufacturer) 452 generates and stores content edition, encryption, and key information received from the content edition entity (AS: Authoring Studio) 451 on the basis of the management information received from the management center (TC: Trusted Center) 454. Further, the management center (TC: Trusted Center) 454 manages and provides the device key stored in the information processing apparatus 453 of the user.

Figure 27:
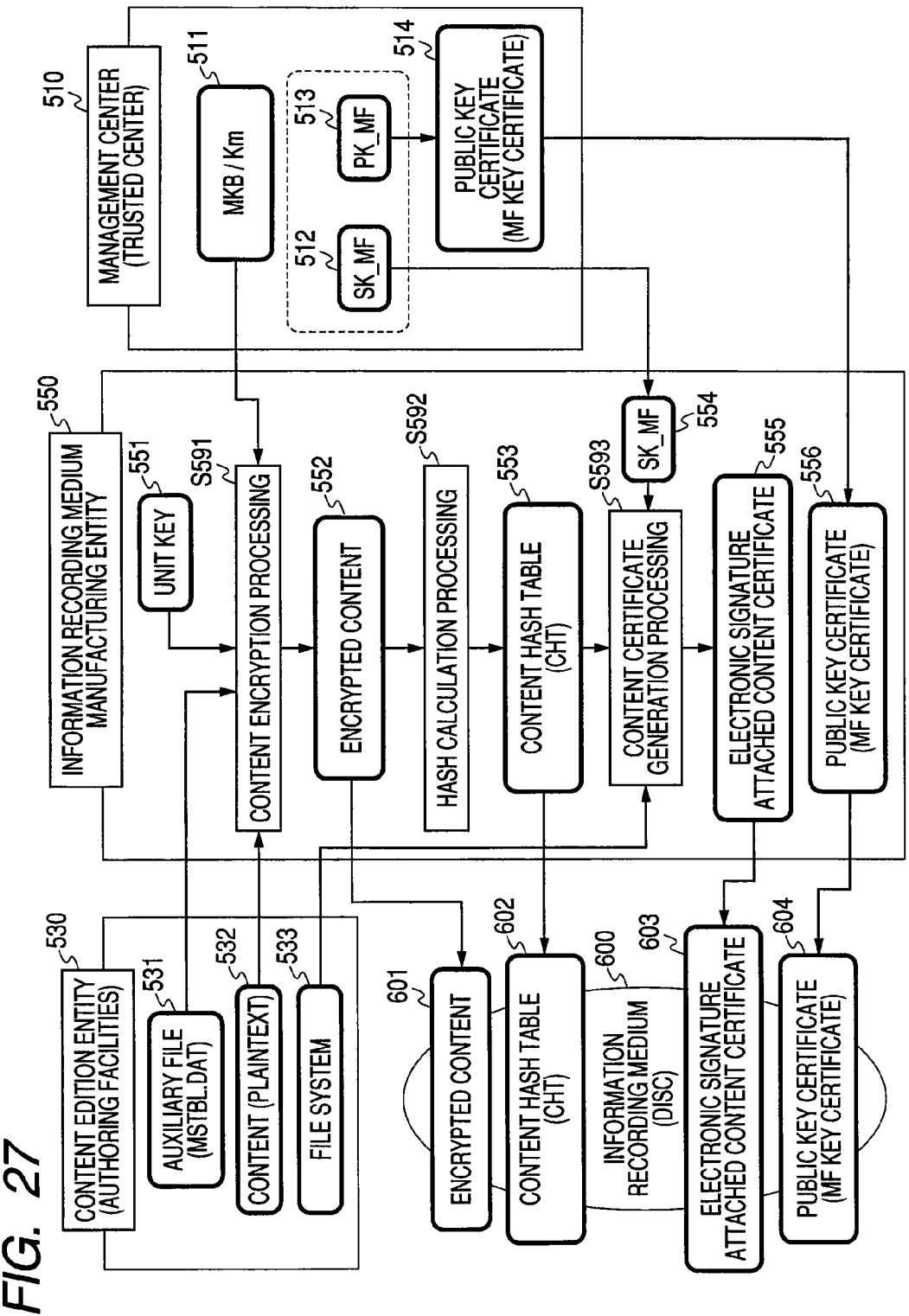
FIG. 27 is a diagram illustrating an example of a processing to be executed by a management center, a content edition entity, and an entity for manufacturing an information recording medium upon manufacturing of information recording medium having stored therein contents.

Next, a flow of data and an overall data processing in case of manufacturing an information recording medium having stored therein data other than the encrypted content is described with reference to FIG. 27. In FIG. 27, a management center (TC: Trusted Center) (=License Facility) 510, a content edition entity (AS: Authoring Studio) (=Authoring Facility) 530, an information recording medium manufacturing entity (DM: Disc Manufacturer) (=Encryption Facility) 550, and the finally manufactured information recording medium (Disc) 600 are shown.

The information recording medium manufacturing entity 550 acquires a media key block (MKB) having stored therein a media key (Km) from the management center 510. Further, the information recording medium manufacturing entity 550 acquires a plaintext content 532, a supplementary file (MST-B.DAT) 531 describing detailed information of an encryption processing, and a file system information 533 from the content edition entity 530, simultaneously with the acquisition of the media key.

The information recording medium manufacturing entity 550 executes the encryption processing (Step S591) of the content using a unit key 551 so as to generate an encrypted content 552. The encryption processing of the content is executed as, for example, an encryption processing of an AES-CBC mode in terms of sectors (see FIG. 7). The generated encrypted content 552 becomes an encrypted content 601 to be stored in the information recording medium 600.

Next, at Step S592, the information recording medium manufacturing entity 550 calculates the hash values of the generated encrypted content 552 in a predetermined data unit (hash unit). This processing is a processing of calculating the hash values in a data unit of 192 KB that is a data length of the hash unit. A content hash table 553, in which the hash values are stored as the collation hash values, is generated. The content hash table 553 becomes a content hash table 602 to be stored in the information recording medium 600.

Next, at Step S593, the information recording medium manufacturing entity 550 executes the generation processing of the content certificate. The content certificate is data for verifying the validity of the content having the data configuration described above with reference to FIGS. 21 to 23. In the content certificate, the content hash digests (see FIGS. 21 to 23) based on the hash values stored in the content hash table 602 are stored. Further, the revision verification value (hash value) of the file system information 533 acquired from the content edition entity 530 is calculated and stored in the content certificate. The electronic signature is added corresponding to the stored data, thereby forming the content certificate described above with reference to FIG. 23.

The management center 510 holds a secret key (SK_MF) 512 and a public key (PK_MF) 513 of the information recording medium manufacturing entity 550, and provides a public key certificate 514 having stored therein the secret key 512 and the public key (PK_MF) 513 to the information recording medium manufacturing entity 550.

The information recording medium manufacturing entity 550 executes the electronic signature on the content certificate using the secret key (SK_MF) 554 received from the management center 510, and generates an electronic signature attached content certificate 555. This becomes a content certificate 603 to be stored in the information recording medium 600.

Next, the information recording medium manufacturing entity 550 records the public key certificate 556 received from the management center 510 in the information recording medium. This becomes a public key certificate 604 to be stored in the information recording medium 600. With the above-described process, the information recording medium 600 having stored therein the contents is completed.

7. Example of Configuration of Information Processing Apparatus

Figure 28:
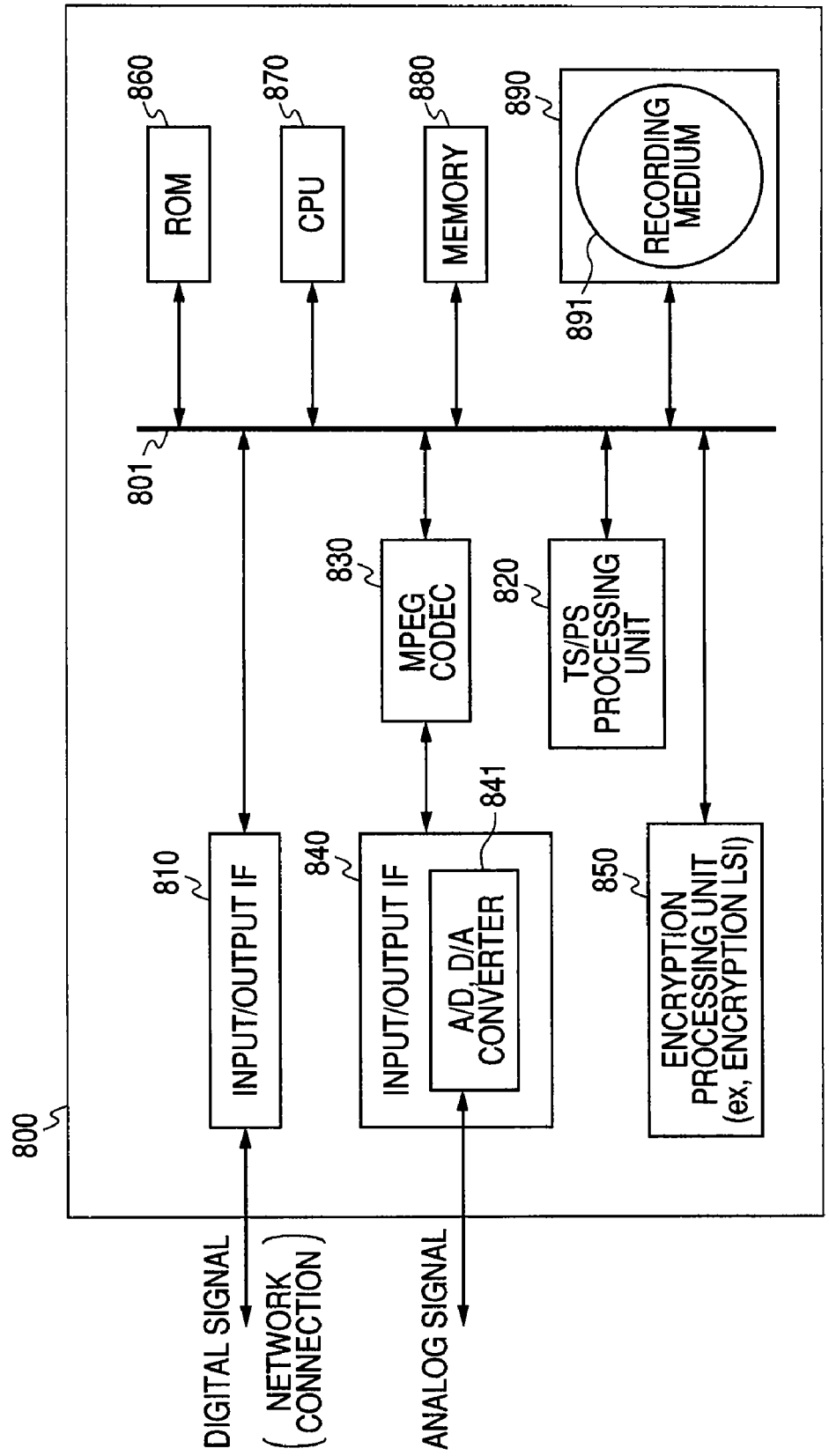
FIG. 28 is a diagram illustrating an example of the configuration of an information processing apparatus that records and plays information in an information recording medium mounted thereon.

Next, an example of the configuration of the information processing apparatus that performs the recording processing or the play processing of the contents will be described with reference to FIG. 28. The information processing apparatus 800 has a drive 890 that drives the information recording medium 891 and inputs/outputs a data recording and playing signal, a CPU 870 that performs a data processing according to various programs, a ROM 860 that serves as a storage region of programs, parameters, and the like, a memory 880, an input/output I/F 810 that inputs/outputs a digital signal, an input/output I/F 840 that inputs/outputs an analog signal and has an A/D or D/A converter 841, an MPEG codec 830 that encodes or decodes MPEG data, a TS/PS processing unit 820 that executes a TS (Transport Stream)/PS (Program Stream) processing, and an encryption processing unit 850 that executes various kinds of encryption processings. The individual blocks are connected to a bus 801.

The encryption processing, the decryption processing, the hash value calculation, and the signature verification processing in the information processing apparatus 800 are executed by the encryption processing unit 850 or a CPU 870, for example, using an AES algorithm or other operation processings. Moreover, a program that executes the content play or recording processing is stored in, for example, a ROM 860 and, during the execution of the program, if necessary, a memory 880 is used as a work area for storing parameters and data.

In the ROM 860 or the memory 880, for example, the device key, the public key of the management center, the secret key corresponding to the information processing apparatus, the public key certificate, a revocation list, and the like are stored.

Upon the play or external output of the content, the content consistency verification processing, and the content revision verification processing based on the registered hash values of the content hash table are executed. In addition, the processing according to each processing sequence of the example of the processing described above, such as the decryption processing of the encrypted content, is executed.

The series of processings described in this description can be performed by any of hardware, software, and a composite configuration of hardware and software. When the processings are performed by software, a program of the processing sequence can be performed after installing it in a memory of a computer incorporated into exclusive-use hardware or installing it in a general-use computer that can perform various processings.

For example, the program can be recorded in advance in a hard disk or a ROM (Read Only Memory) as a recording medium. Alternatively, the program can be temporarily or permanently stored (recorded) in a removable recording medium, such as a flexible disk, a CD-ROM (Compact Disc Read Only Memory), an MO (Magneto Optical) disk, a DVD (Digital Versatile Disc), a magnetic disk, or a semiconductor memory. The removable recording medium can be provided as so-called package software.

The program can be installed from the above-described removable recording medium to a computer. Alternatively, the program can be wirelessly transferred from a download site to the computer or transferred in a wired manner through a network, such as a LAN (Local Area Network) or Internet.

The computer can receive the program transmitted in such a manner and install the program in an internal recording medium, such as a hard disk.

Various processings described in the specification may be executed in time series according to the sequence of the descriptions or may be executed in parallel or individually according to a processing ability of an apparatus that executes the processings or if necessary. Further, in the specification, the system refers to a logical group of a plurality of devices, but the devices having different configurations are not necessarily provided in the same casing.

According to the configuration of an embodiment, presence/absence of the illegal recording content, the hash value of which is not registered, is verified on the basis of the recorded information of the content hash table, in which the hash values generated on the basis of the legal recording content data is registered. Therefore, it is possible to prevent illegal utilization of an illegally added and recorded content. For example, with the verification of consistency of the file size of the content data file of the information recording medium and the number of hash units corresponding to the content data file registered in the content hash table, presence/absence of a recording content whose hash value is not registered is verified. As a result, an efficient verification processing can be implemented.

According to the configuration of an embodiment, with the revision verification processing of the file system information recorded in the information recording medium, illegal utilization of an illegally added and recorded content can be prevented. For example, the collation hash value generated on the basis of the file system information is acquired from the electronic signature attached content certificate, and the collation hash value is acquired after signature verification of the content certificate, so as to execute the collation processing of the collation hash value and the hash value calculated on the basis of the file system information read out from the information recording medium. As a result, reliable content verification can be performed.

It should be understood by those skilled in the art that various modifications, combinations, sub-combinations, and alternations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus comprising:
a processor, and
a memory device which stores a plurality of instructions, which when executed by the processor, cause the information processing apparatus to:
execute a verification processing of a recording content recorded on an information recording medium; and
execute a content play processing on a condition that a validity of the recording content is checked on the basis of the verification processing,
wherein the processor is configured to:
(i) acquire from the information recording medium a content hash table having registered therein hash values generated on the basis of legal recording content data, wherein the hash values are calculated according to a hash value calculation algorithm,
(ii) execute a processing for verifying a presence or absence of an illegal recording content whose hash value is not registered in the content hash table, wherein the content hash table registers a hash value for each hash unit having a prescribed data amount and a number of hash units corresponding to each of at least one content data file, and the processor randomly selects a plurality of said hash units to compare with associated hash values to verify the presence or absence of said illegal recording content, and
(iii) stop said content play processing if said verification process indicates said presence of said illegal recording content.

2. The information processing apparatus according to claim 1, wherein the processor is configured to verify:
(a) consistency of a file size of a content data file of the information recording medium and the number of hash units corresponding to a content data file registered in the content hash table, and
(b) presence or absence of the recording content whose hash value is not registered.

3. The information processing apparatus according to claim 2,
wherein the content data file is a clip file that is a data file including contents, and the processor is configured to verify:
(a) consistency of a file size of a clip file recorded on the information recording medium and the number of hash units corresponding to a clip file registered in the content hash table, and
(b) a presence or absence of the recording content whose hash value is not registered.

4. The information processing apparatus according to claim 2,
wherein the processor is configured to acquire the file size of the content data file recorded on the information recording medium from file system information recorded on the information recording medium.

5. The information processing apparatus according to claim 1,
wherein the processor is configured to:
select n hash units, where n is (i) an integer of 1 or more and (ii) less than a total number of hash units recorded in the content hash table,
execute a collation processing of arithmetic hash values based on the selected hash units and a hash value stored in the content hash table, and
execute the content verification processing on a condition that a validity of the content is checked when collation of all the selected n hash values is established.

6. An information processing apparatus comprising:
a processor, and
a memory device which stores a plurality of instructions, which when executed by the processor, cause the information processing apparatus to:
execute a verification processing of a recording content recorded on an information recording medium; and
execute a content play processing on a condition that a validity of the recording content is checked on the basis of the verification process, wherein the processor is configured to:
execute a revision verification processing of file system information recorded on the information recording medium as the content verification processing, wherein the file system information corresponds to the recording content recorded on the information recording medium, wherein the processor randomly selects a plurality of hash units associated with the recording content to verify the presence or absence of illegal recording content, acquire a file system information hash value generated on the basis of the file system information, wherein the hash values are calculated according to a hash value calculation algorithm, and stop said content play processing if said verification process indicates said presence of said illegal recording content.

7. The information processing apparatus according to claim 6,
   wherein the processor is configured to acquire:
   electronic signature attached certificate data, which stores the file system information hash value, wherein the file system information hash value stored in the electronic signature attached certificate data is generated on the basis of the file system information from the information recording medium, and
   the file system information hash value, wherein the processor acquires said file system information hash value after signature verification of the certificate data so as to execute a collation processing with a hash value calculated on the basis of the file system information read out from the information recording medium.

8. The information processing apparatus according to claim 7, wherein said certificate is a content certificate having stored therein verification data corresponding to a content hash table, in which a hash value generated on the basis of legal recording content data is stored, and
   wherein the processor is configured to check a validity of the content certificate on the basis of signature verification of the content certificate, and performs an acquisition processing of the file system information hash value from the content certificate whose validity is checked.

9. The information processing apparatus according to claim 6, wherein the processor is configured to:
   randomly select n hash units, where n is (i) an integer of 1 or more and (ii) less than a total number of hash units recorded in the content hash table,
   execute a collation processing of arithmetic hash values based on the randomly selected hash units and a hash value stored in a content hash table, and
   execute the content verification processing on a condition that a validity of the content is checked when collation of all the selected n hash values is established.

10. An apparatus for manufacturing an information recording medium, comprising:
    a processor, and
    a memory device which stores a plurality of instructions, which when executed by the processor, cause the apparatus to:
    generate file system information corresponding to a recording content of an information recording medium;
    calculate a file system information hash value of the file system information, wherein the hash value is calculated according to a hash value calculation algorithm; and
    record the file system information and the file system information hash value on the information recording medium, wherein the information recording medium is configured to communicate with an information processing apparatus to:
    randomly select a plurality of hash units corresponding to a plurality of said file system information hash values, wherein the corresponding file system information hash values are associated with the recording content to verify the presence or absence of illegal recording content,
    execute a content play processing on a condition that the validity of the recording content is checked on the basis of the verification processing, and
    stop said content play processing if said verification process indicates said presence of said illegal recording content.

11. The apparatus for manufacturing an information recording medium according to claim 10, wherein the processor is further configured to:
    generate a content hash table having registered therein a hash value generated on the basis of the recording content data of the information recording medium; and
    generate verification data of the content hash table and a content certificate having the file system information hash value as registration information,
    wherein the processor records the content hash table and the content certificate on the information recording medium.

12. An information processing method comprising:
    causing a processor to execute a plurality of instructions to:
    execute a verification processing of a recording content recorded on an information recording medium;
    execute a content play processing on a condition that validity of the recording content is checked on the basis of the verification processing,
        wherein, when executing the verification processing, the processor is configured to acquire a content hash table having registered therein hash values generated on the basis of legal recording content data, and the processor is configured to execute a processing of verifying a presence or absence of illegal recording content whose hash value is not registered in the content hash table, wherein the content hash table registers a hash value for each hash unit having a prescribed data amount and a number of hash units corresponding to each of at least one content data file, and the processor is configured to randomly select a plurality of hash units to compare with associated hash values to verify the presence or absence of said illegal recording content, wherein the hash values are calculated according to a hash value calculation algorithm, and
    stop said content play processing if said verification process indicates said presence of said illegal recording content.

13. The information processing method according to claim 12,
    wherein executing the verification processing includes causing the processor to verify consistency of a file size of a content data file of the information recording medium and the number of hash units corresponding to a content data file registered in the content hash table, and causing the processor to verify a presence or absence of the recording content whose hash value is not registered.

14. The information processing method according to claim 13,
    wherein the content data file is a clip file that is defined as a data file including contents, and
    wherein executing the verification processing includes causing the processor to verify consistency of a file size of a clip file recorded on the information recording medium and the number of randomly selected hash units corresponding to a clip file registered in the content hash table, and causing the processor to verify a presence or absence of the recording content whose hash value is not registered.

15. The information processing method according to claim 13,
wherein executing the verification processing includes causing the processor to acquire the file size of the content data file recorded on the information recording medium from file system information recorded on the information recording medium.

16. The information processing method according to claim 12, further comprising:
causing the processor to:
randomly select n hash units, where n is (i) an integer of 1 or more and (ii) less than a total number of hash units recorded in the content hash table, executing a collation processing of arithmetic hash values based on the randomly selected hash units and a hash value stored in the content hash table, and
execute the content verification processing on a condition that a validity of the content is checked when collation of all the selected n hash values is established.

17. An information processing method comprising:
causing a processor to execute a plurality of instructions stored on a memory device to:
execute a verification processing of a recording content recorded on an information recording medium;
execute a content play processing on a condition that a validity of the recording content is checked on the basis of the verification processing,
wherein executing the verification processing includes executing a revision verification processing of file system information recorded on the information recording medium as the content verification processing, wherein the file system information corresponds to the recording content recorded on the information recording medium, wherein the content verification means acquires a file system information hash value generated on the basis of the file system information, and wherein the revision verification processing includes randomly selecting a plurality of hash units to compare with associated hash values to verify the presence or absence of said illegal recording content, wherein the hash values are calculated according to a hash value calculation algorithm, and
stop said content play processing if said verification process indicates said presence of said illegal recording content.

18. The information processing method according to claim 17,
wherein, when executing the verification processing, the processor:
acquires electronic signature attached certificate data having stored therein the file system information hash value generated on the basis of the file system information from the information recording medium, and
acquires the file system information hash value after signature verification of the certificate data so as to execute a collation processing with a hash value calculated on the basis of the file system information read from the information recording medium.

19. The information processing method according to claim 18,
wherein the certificate is a content certificate having stored therein verification data corresponding to a content hash table, in which a hash value generated on the basis of legal recording content data is stored, and wherein executing the verification processing includes:
causing the processor to check a validity of the content certificate on the basis of signature verification of the content certificate, and
causing the processor to perform an acquisition processing of the file system information hash value from the content certificate whose validity is checked.

20. The information processing method according to claim 17, further comprising:
causing the processor to:
randomly select n hash units, where n is (i) an integer of 1 or more and (ii) less than a total number of hash units recorded in the content hash table,
execute a collation processing of arithmetic hash values based on the randomly selected hash units and a hash value stored in the content hash table, and
execute the content verification processing on a condition that validity of the content is checked when collation of all the selected n hash values is established.

21. A method of manufacturing an information recording medium, comprising:
causing a processor to execute a plurality of instructions stored on a memory device to:
generate file system information corresponding to a recording content of an information recording medium;
calculate a file system information hash value of the file system information, wherein the hash value is calculated according to a hash value calculation algorithm; and
record the file system information and the file system information hash value on the information recording medium, wherein the information recording medium is configured to communicate with an information processing apparatus to:
randomly select a plurality of hash units corresponding to a plurality of said file system information hash values, wherein the corresponding file system information hash values are associated with the recording content to verify the presence or absence of illegal recording content,
execute a content play processing on a condition that the validity of the recording content is checked on the basis of the verification processing, and
stop said content play processing if said verification process indicates said presence of said illegal recording content.

22. The method of manufacturing an information recording medium according to claim 21, further comprising:
causing the processor to execute the plurality of instructions to:
generate a content hash table having registered therein a hash value generated on the basis of the recording content data of the information recording medium;
generate verification data of the content hash table and a content certificate having the file system information hash value as registration information; and
record the content hash table and the content certificate on the information recording medium.

23. A non-transitory computer readable medium storing instructions structured to cause an information processing apparatus to execute a verification processing of a recording content recorded on an information recording medium, the computer program comprising:
causing a processor to execute a plurality of instructions stored on a memory device to cause the information processing apparatus to:
execute a verification processing of a recording content recorded on an information recording medium; and execute a content play processing on a condition that a validity of the recording content is checked on the basis of the verification processing, wherein executing the verification processing includes causing the processor to:

acquire a content hash table having registered therein hash values generated on the basis of legal recording content data, wherein the hash values are calculated according to a hash value calculation algorithm, execute a processing of verifying a presence or absence of illegal recording content whose hash value is not registered in the content hash table, wherein the content hash table registers a hash value for each hash unit having a prescribed data amount and a number of hash units corresponding to each of at least one content data file, and the processor randomly selects a plurality of said hash units to compare with associated hash values to verify the presence or absence of said illegal recording content, and stop said content play processing if said verification process indicates said presence of said illegal recording content.

24. A non-transitory computer readable medium storing instructions structured to cause an information processing apparatus to execute a verification processing of a recording content recorded on an information recording medium, the computer program comprising:

causing a processor to execute a plurality of instructions stored on a memory device to cause the information processing apparatus to:

execute a verification processing of a recording content recorded on an information recording medium; and execute a content play processing on a condition that a validity of the recording content is checked on the basis of the verification processing, wherein the processor is configured to:

execute a revision verification processing of file system information recorded on the information recording medium as the content verification processing, wherein the file system information corresponds to the recording content recorded on the information recording medium, wherein the processor randomly selects a plurality of hash units associated with the recording content to verify the presence or absence of illegal recording content, acquire a file system information hash value generated on the basis of the file system information, wherein the hash value is calculated according to a hash value calculation algorithm, and stop said content play processing if said verification process indicates said presence of said illegal recording content.

25. An information processing apparatus comprising:

a processor, and a memory device which stores a plurality of instructions, which when executed by the processor, cause the information processing apparatus to operate with:

a content verification unit to execute a verification processing of a recording content recorded on an information recording medium;

a content play unit to execute a content play processing on a condition that validity of the recording content is checked on the basis of the verification processing, wherein the content verification unit is configured to acquire a content hash table having registered therein hash values generated on the basis of legal recording content data and executes a processing for verifying a presence or absence of an illegal recording content whose hash value is not registered in the content hash table, wherein the content hash table registers a hash value for each hash unit having a prescribed data amount and a number of hash units corresponding to each of at least one content data file, and the processor randomly selects a plurality of said hash units to compare with associated hash values to verify the presence or absence of said illegal recording content, wherein the hash values are calculated according to a hash value calculation algorithm, and stop said content play processing if said verification process indicates said presence of said illegal recording content.

26. An information processing apparatus comprising:

a processor, and a memory device which stores a plurality of instructions, which when executed by the processor, cause the information processing apparatus to operate with:

a content verification unit to execute a verification processing of a recording content recorded on an information recording medium;

a content play unit to execute a content play processing on a condition that validity of the recording content is checked on the basis of the verification processing, wherein the content verification unit is configured to execute a revision verification processing of file system information recorded on the information recording medium as the content verification processing, wherein the file system information corresponds to the recording content recorded on the information recording medium, wherein the processor randomly selects a plurality of hash units associated with the recording content to verify the presence or absence of illegal recording content, and wherein the content verification unit acquires a file system information hash value generated on the basis of the file system information, wherein the hash values are calculated according to a hash value calculation algorithm, and stop said content play processing if said verification process indicates said presence of said illegal recording content.

27. An apparatus for manufacturing an information recording medium, comprising:

a processor, and a memory device which stores a plurality of instructions, which when executed by the processor, cause the apparatus to:

generate file system information corresponding to a recording content of an information recording medium;

calculate a file system information hash value of the file system information, wherein the hash value is calculated according to a hash value calculation algorithm; and record the file system information and the file system information hash value on the information recording medium, wherein the information recording medium is configured to communicate with an information processing apparatus to:

randomly select a plurality of hash units corresponding to a plurality of said file system information hash values, wherein the corresponding file system information hash values are associated with the recording content to verify the presence or absence of illegal recording content, execute a content play processing on a condition that the validity of the recording content is checked on the basis of the verification processing, and stop said content play processing if said verification process indicates said presence of said illegal recording content.

* * * * *